United States Patent
Fujii

[19]

[11] Patent Number: 6,076,122
[45] Date of Patent: *Jun. 13, 2000

[54] MICROCOMPUTER COMMUNICATING ANALOG-TO-DIGITAL CONVERSION RESULTS TO CENTRAL PROCESSING UNIT

[75] Inventor: Takeshi Fujii, Hyogo, Japan

[73] Assignees: Mitsubishi Electric Semiconductor Software Co., Ltd., Hyogo; Mitsubishi Denki Kabushiki Kaisha, Tokyo, both of Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/806,047

[22] Filed: Feb. 25, 1997

[30] Foreign Application Priority Data

Oct. 1, 1996  [JP]  Japan .................... 8-260662

[51] Int. Cl.[7] .................................. H03M 1/12
[52] U.S. Cl. ................ 710/69; 341/155; 712/36
[58] Field of Search ..................... 341/155, 156, 341/142, 145, 154, 161; 395/800.01, 800.32, 885, 889; 712/1, 32, 36; 710/65, 69

[56] References Cited

U.S. PATENT DOCUMENTS

| | | | |
|---|---|---|---|
| 3,654,557 | 4/1972 | Sakamoto et al. | 325/465 |
| 4,309,754 | 1/1982 | Dinwiddie, Jr. | 710/127 |
| 4,903,028 | 2/1990 | Fukushima | 341/156 |
| 5,394,147 | 2/1995 | Miyake | 341/161 |
| 5,583,503 | 12/1996 | Kusakabe | 341/161 |
| 5,675,337 | 10/1997 | Moriyama | 341/141 |
| 5,686,918 | 11/1997 | Uda | 341/161 |
| 5,760,721 | 6/1998 | Inoue | 341/141 |

OTHER PUBLICATIONS

"M34520MX–XXXSP/FP User's Manual"; issued Aug., 1993.

*Primary Examiner*—Thomas C. Lee
*Assistant Examiner*—Albert Wang
*Attorney, Agent, or Firm*—Leydig, Voit & Mayer, Ltd.

[57] ABSTRACT

A microcomputer includes an analog-to-digital (AD) converter which converts analog data into digital data and then stores a plurality of data bits which represent the digital data, a read signal output unit for producing a read signal for identifying the value of the digital data stored in the AD converter, a gate circuit which, in response to the read signal from the read signal output unit, obtains a plurality of data bits at the uppermost or lowermost end of the digital data from the digital data stored in the AD converter, a skip circuit which, in response to the read signal, obtains remaining data bits, other than the plurality of data bits obtained by the gate unit, from the digital data stored in the AD converter and produces a control signal having a second value which differs according to the value of the remaining data bits and a data identifying unit which identifies the value of the digital data on the basis of the plurality of data bits supplied by the gate unit and by the control signal.

20 Claims, 28 Drawing Sheets

FIG.7

VALUE OF SIGNAL P00

| D4 / D5 | 0 | 1 |
|---|---|---|
| 0 | H | L |
| 1 | L | L |

FIG.8

VALUE OF SIGNAL P01

| D4 / D5 | 0 | 1 |
|---|---|---|
| 0 | L | H |
| 1 | L | L |

FIG.9

VALUE OF SIGNAL P10

| D4 / D5 | 0 | 1 |
|---|---|---|
| 0 | L | L |
| 1 | H | L |

FIG.10

VALUE OF SIGNAL P11

| D4 / D5 | 0 | 1 |
|---|---|---|
| 0 | L | L |
| 1 | L | H |

MICROCOMPUTER COMMUNICATING ANALOG-TO-DIGITAL CONVERSION RESULTS TO CENTRAL PROCESSING UNIT

BACKGROUND OF THE INVENTION

1. Field of the Invention

The present invention relates to a microcomputer which can read analog-to-digital converted results from an analog-to-digital (AD) converter built in the microcomputer.

2. Description of the Prior Art

Referring now to FIG. 29, there is illustrated a block diagram of a prior art microcomputer. In the figure, reference numeral 1 denotes an AD register disposed in an AD converter (see FIG. 30) for storing digital data which is an AD conversion result produced by the AD converter, which will be mentioned below, as a set of a plurality of data bits D0 to D4, 2 denotes a central processing unit (CPU) which is adapted to read the lowermost four data bits (i.e., a plurality of data bits D0 to D3) of digital data stored in the AD register 1 by furnishing an instruction signal c to read the lowermost four bits and, after that, read the uppermost data bit (i.e., data bit D4) of the digital data by furnishing an instruction signal ax to read the uppermost bit so as to identify the value of the digital data, 3 denotes a gate circuit for getting and furnishing the data bits D0 to D3 stored in the AD register 1 by way of a data bus 4 of the microcomputer in response to the lowermost four bits reading instruction signal c from the CPU 2, and 5 denotes a gate circuit for getting and furnishing the data bit D4 stored in the AD register 1 by way of the data bus 4 in response to the uppermost bit reading instruction signal ax from the CPU 2.

Referring next to FIG. 30, there is illustrated a block diagram showing the structure of the AD converter. In the figure, reference numeral 6 denotes a reference voltage input terminal through which a reference voltage ao can be applied, 7 denotes a ground voltage input terminal through which a ground voltage ap can be applied, 8 denotes an AD ladder resistor which can furnish a comparison voltage ar according to the reference voltage ao and a value stored in a successive comparison register 12, 9 denotes an analog input terminal through which an analog data aq to be analog-to-digital converted can be applied, 10 denotes a comparison circuit which compares the analog data aq with the comparison voltage ar to furnish a comparison result at, and 11 denotes an AD conversion control circuit which furnishes a comparison result signal au according to the comparison result at from the comparison circuit 10 so as to change the value stored in the successive comparison register 12. Thus, the value stored in the successive comparison register 12 is used for setting the comparison voltage ar.

When the AD converter begins its AD converting operation, "10000B" is written into the successive comparison register 12 as its initial value. In this case, the data bits D0 to D3 are "0" and the data bit D4 is "1". Then, the reference voltage ao of 3.2 V is applied to the reference voltage input terminal 6, and the ground voltage of 0 V is applied to the ground voltage input terminal 7. When the microcomputer is thus set to such a state initially, the AD ladder resistor 8 calculates the comparison voltage ar by substituting the reference voltage ao and the value stored in the successive comparison register 12 into the following expression so as to apply the comparison voltage ar to the comparison circuit 10.

Comparison voltage ar=(the reference voltage ao/32)×(the value in the successive comparison register 12)−(the reference voltage ao/64)   (1)

Accordingly, the value of the comparison voltage ar is 1.55 V under the above initial condition.

When the AD ladder resistor 8 furnishes the comparison voltage ar, the comparison circuit 10 compares the analog data aq with the comparison voltage ar. For example, when the analog data aq is 1.0 V, the comparison circuit 10 furnishes the comparison result at showing that the analog data aq is lower than the comparison voltage ar (i.e., 1.55 V) to the AD conversion control circuit 11.

When the AD conversion control circuit 11 receives the comparison result at, it furnishes the comparison result signal au requesting reduction in the comparison voltage ar to the successive comparison register 12. When the successive comparison register 12 receives the comparison result signal au, it replaces the value stored therein by "01000B". That is, the data bit D4 is changed from "1" to "0" and the data bit D3 is changed from "0" to "1", so that the value is reduced to the half.

When the value of the successive comparison register 12 is thus changed, the AD ladder resistor 8 calculates the comparison voltage ar by substituting the reference voltage ao and the updated value stored in the successive comparison register 12 into the above expression (1) so as to apply the comparison voltage ar to the comparison circuit 10. Under this condition, the comparison voltage ar becomes 0.75 V.

When the AD ladder resistor 8 furnishes the comparison voltage ar, the comparison circuit 10 compares the analog data aq with the comparison voltage ar. For example, when the analog data aq is 1.0 V, since the analog data aq is larger than the comparison voltage ar (i.e., 0.75 V), the comparison circuit 10 furnishes the comparison result at showing that the analog data aq is larger than the comparison voltage ar to the AD conversion control circuit 11. When the AD conversion control circuit 11 receives the comparison result at, it furnishes the comparison result signal au requesting an increase in the comparison voltage ar to the successive comparison register 12. When the successive comparison register 12 receives the comparison result signal au, it replaces the value stored therein by "01100B". That is, the data bits D4 and D3 are fixed so as to keep their current values, and the bit data D2 is changed from "0" to "1".

The above-mentioned operation is repeated until the data bits D4 to D0 are fixed; since the number of bits of the successive register 12 is five, the values of the bit data D4 to D0 can be fixed by repeating the above operation five times. When the respective values of the bit data D4 to D0 are fixed, the AD conversion control circuit 11 transfers the value stored in the successive comparison register 12 as the AD conversion result to the AD register 1. Thus, the AD conversion is completed. Then, the AD conversion control circuit 11 furnishes the AD conversion end signal ac showing that the AD conversion has been completed to the CPU 2.

Referring next to FIG. 31, there is illustrated a flow diagram showing the operation of the prior art microcomputer. When the AD conversion control circuit 11 furnishes the AD conversion end signal ac, the CPU 2, in step ST1, furnishes the lowermost four bits reading instruction signal c to the gate circuit 3. As a result, the gate circuit 3 makes a transition from the nonconducting state to the conducting state in step ST2, and therefore the lowermost four data bits (i.e., data bits D0 to D3) stored in the AD register 1 are delivered by way of the data bus 4. Accordingly, the CPU 2, in step ST3, reads the data bits D0 to D3 from the data bus 4.

Then, when the CPU 2 has completed reading these data bits D0 to D3, it furnishes the uppermost bit reading instruction signal ax to the gate circuit 5 in step ST4. As a result, the gate circuit 5 makes a transition from the non-conducting state to the conducting state in step ST5, and therefore the uppermost data bit (i.e., data bit D4) stored in the AD register 1 is delivered by way of the data bus 4. Accordingly, the CPU 2, in step ST6, reads the data bit D4 from the data bus 4.

When the CPU 2 has completed reading the data bits D0 to D4, it can identify the value of the digital data obtained by the AD conversion from the bit data D0 to D4 in step ST7. The series of processes are thus complete.

Since the prior art microcomputer is constructed as mentioned above, in the case where the number of the data bits D0 to D4 stored in the AD register 1 exceeds the number of bits (e.g., four bits in the prior art microcomputer shown in FIG. 29) that can be read at one time by the CPU 2, the CPU 2 cannot read the respective values of the data bits D0 to D4 stored in the AD register 1 at one time. Therefore, a problem with the prior art microcomputer is that it cannot promptly identify the value of digital data obtained by AD conversion since it has to read the data by dividing the reading process into at least two successive parts.

SUMMARY OF THE INVENTION

The object of the present invention is to overcome the above problem. More precisely, it is an object of the present invention to provide a microcomputer capable of promptly identifying the value of digital data stored in the AD register thereof as an AD conversion result even though the number of all the data bits of the digital data exceeds the number of bits that can be read at a time by the CPU.

In accordance with one aspect of the present invention, there is provided a microcomputer comprising: an analog-to-digital (AD) converter for converting an analog data into a digital data and then storing a plurality of bit data which construct the digital data therein; a read signal output unit for furnishing a read signal when the microcomputer needs to identify the value of the digital data stored in the analog-to-digital converter; a gate circuit, responsive to the read signal from the read signal output unit, for obtaining a plurality of bit data at the high-order or low-order end of the digital data from all the data bits of the digital data stored in the analog-to-digital converter so as to furnish them; a control signal output unit, responsive to the read signal from the read signal output unit, for obtaining all remaining bit data other than the plurality of bit data obtained by the gate circuit from all the bit data of the digital data stored in the analog-to-digital converter so as to furnish a control signal having a value which differs according to the value of the remaining bit data; and a data identifying unit which identifies the value of the digital data on the basis of the plurality of bit data furnished by the gate circuit and the control signal furnished by the control signal output unit.

In accordance with a preferred embodiment of the present invention, the read signal furnished by the read signal output unit has a value which differs according to whether the microcomputer needs to identify the plurality of bit data at the high-order or low-order end of the digital data, and wherein the gate circuit obtains the plurality of bit data at the high-order end of the digital data stored in the AD converter when the read signal shows that the microcomputer needs to identify the plurality of bit data at the high-order of the digital data and alternatively obtains the plurality of bit data at the low-order end of the digital data stored in the AD converter when the read signal shows that the microcomputer needs to identify the plurality of bit data at the low-order of the digital data.

In accordance with another preferred embodiment of the present invention, the control signal output unit determines whether or not the value of the remaining bit data that the control signal output unit has obtained from the AD converter is coincident with a predetermined value so as to set the value of the control signal according to the determination result.

In accordance with another preferred embodiment of the present invention, the control signal output unit includes a saving register for storing the remaining bit data that the control signal output unit has obtained from the AD converter.

In accordance with another preferred embodiment of the present invention, after the microcomputer executes an instruction for forcing itself to neglect the remaining bit data during the execution of a software program including the instruction, the data identifying unit identifies the value of the digital data on the basis of only the plurality of bit data furnished by the gate circuit.

In accordance with another preferred embodiment of the present invention, the data identifying unit determines whether or not it skips an instruction included in a software program to be executed next according to the value of the control signal furnished by the control signal output unit.

In accordance with another preferred embodiment of the present invention, the control signal furnished by the control signal output unit represents an interrupt address and the microcomputer executes an interrupt program specified by the interruption address.

In accordance with another aspect of the present invention, there is provided a microcomputer comprising: an analog-to-digital converting (AD) unit for converting an analog data into a digital data and then storing a plurality of bit data which construct the digital data therein; a read signal output unit for furnishing a read signal when the microcomputer needs to identify the value of the digital data stored in the analog-to-digital converter; an instruction signal output unit for furnishing an instruction signal when the microcomputer executes a predetermined instruction associated with the digital data; a gate circuit, responsive to the read signal from the read signal output unit, for obtaining a plurality of bit data at the high-order or low-order end of the digital data from all the bit data of the digital data stored in the analog-to-digital converter so as to furnish them; a control signal output unit, responsive to the instruction signal from the instruction signal output unit, for obtaining all remaining bit data other than the plurality of bit data obtained by the gate circuit from all the bit data of the digital data stored in the analog-to-digital converter so as to furnish a control signal having a value which differs according to the value of the remaining bit data; and a data identifying unit which identifies the value of the digital data on the basis of the plurality of bit data furnished by the gate circuit and the control signal furnished by the control signal output unit.

In accordance with a preferred embodiment of the present invention, the predetermined instruction is a skip instruction to skip an instruction to be executed next.

In accordance with another preferred embodiment of the present invention, the predetermined instruction is an increment instruction to increment the value of the remaining bit data of the digital data.

In accordance with another preferred embodiment of the present invention, the predetermined instruction is an add instruction to add a certain value to the value of the remaining bit data of the digital data.

In accordance with another preferred embodiment of the present invention, the read signal furnished by the read signal output unit has a value which differs according to whether the microcomputer needs to identify the plurality of bit data at the high-order or low-order end of the digital data, and wherein the gate circuit obtains the plurality of bit data at the high-order end of the digital data stored in the AD converter when the read signal shows that the microcomputer needs to identify the plurality of bit data at the high-order of the digital data and obtains the plurality of bit data at the low-order end of the digital data stored in the AD converter when the read signal shows that the microcomputer needs to identify the plurality of bit data at the low-order of the digital data.

In accordance with another preferred embodiment of the present invention, the control signal output unit determines whether or not the value of the remaining bit data that the control signal output unit has obtained from the AD converter is coincident with a predetermined value so as to set the value of the control signal according to the determination result.

In accordance with another preferred embodiment of the present invention, the control signal output unit includes a saving register for storing the remaining bit data that the control signal output unit has obtained from the AD converter.

In accordance with another preferred embodiment of the present invention, when the microcomputer executes an instruction for forcing itself to neglect the remaining data during the program's execution, the data identifying unit identifies the value of the digital data on the basis of only the plurality of bit data furnished by the gate circuit.

In accordance with another preferred embodiment of the present invention, the data identifying unit determines whether or not it skips an instruction included in a software program to be executed next according to the value of the control signal furnished by the control signal output unit.

In accordance with another preferred embodiment of the present invention, the control signal furnished by the control signal output unit represents an interrupt address and the microcomputer executes an interrupt program specified by the interruption address.

In accordance with another aspect of the present invention, there is provided a microcomputer comprising: an analog-to-digital (AD) converter for converting an analog data into a digital data, and then storing a plurality of bit data which construct the digital data therein and furnishing an AD conversion end signal; a read signal output unit for furnishing a read signal when the microcomputer needs to identify the value of the digital data stored in the analog-to-digital converter; a gate circuit, responsive to the read signal from the read signal output unit, for obtaining a plurality of bit data at the high-order or low-order end of the digital data from all the bit data of the digital data stored in the analog-to-digital converter so as to furnish them; a control signal output unit, responsive to the AD conversion end signal from the AD converter, for obtaining all remaining bit data other than the plurality of bit data obtained by the gate circuit from all the bit data of the digital data stored in the analog-to-digital converter so as to furnish a control signal having a value which differs according to the value of the remaining bit data; and a data identifying unit which identifies the value of the digital data on the basis of the plurality of bit data furnished by the gate circuit and the control signal furnished by the control signal output unit.

In accordance with a preferred embodiment of the present invention, after the microcomputer executes an instruction for forcing itself to neglect the remaining bit data during the execution of a program including the instruction, the data identifying unit identifies the value of the digital data on the basis of only the plurality of bit data furnished by the gate circuit.

In accordance with another preferred embodiment of the present invention, the control signal furnished by the control signal output unit represents an interrupt address and the microcomputer executes an interrupt program specified by the interruption address.

Further objects and advantages of the present invention will be apparent from the following description of the preferred embodiments of the invention as illustrated in the accompanying drawings.

BRIEF DESCRIPTION OF THE DRAWINGS

FIG. 7 is a table showing an input/output relationship of a decode circuit of the microcomputer according to the fourth embodiment;

FIG. 8 is a table showing another input/output relationship of a decode circuit of the microcomputer according to the fourth embodiment;

FIG. 9 is a table showing another input/output relationship of a decode circuit of the microcomputer according to the fourth embodiment;

FIG. 10 is a table showing another input/output relationship of a decode circuit of the microcomputer according to the fourth embodiment;

DETAILED DESCRIPTION OF THE PREFERRED EMBODIMENTS

Figure 1:
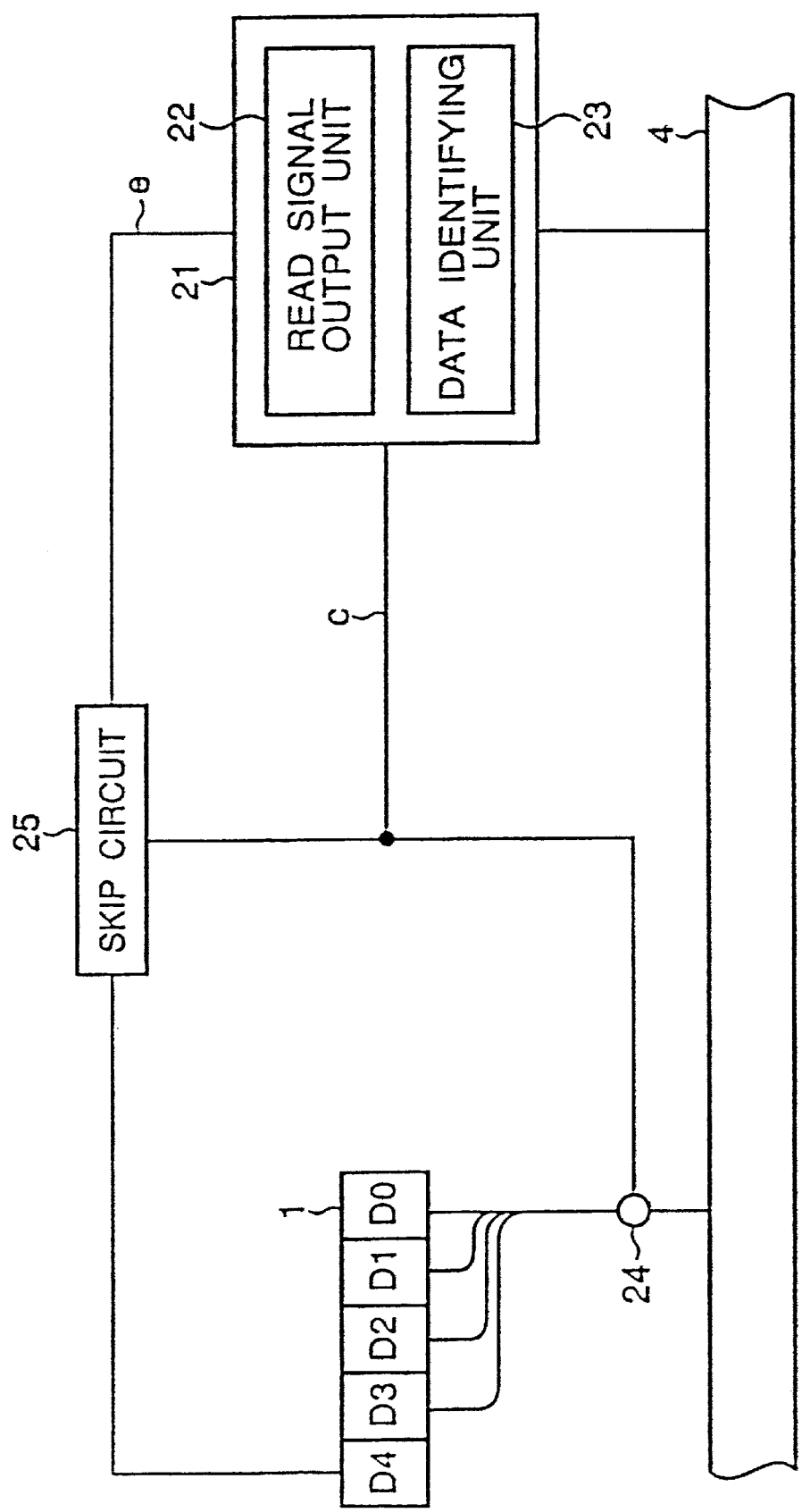
FIG. 1 is a block diagram showing the structure of a microcomputer according to a first embodiment of the present invention.

Referring now to FIG. 1, there is illustrated a block diagram showing the structure of a microcomputer according to a first embodiment of the present invention. In the figure, reference numeral 1 denotes an AD register disposed in an AD converter (see FIG. 30), for storing digital data which is an AD conversion result obtained by the AD converter as a set of a plurality of bit data D0 to D4, 4 denotes a data bus disposed in the microcomputer, 21 denotes a central processing unit (CPU) provided with a read signal output unit 22 which can furnish a lowermost four bits reading instruction signal c to read the lowermost four bits of the digital data stored in the AD register, and a data identifying unit 23 which can identify the value of the digital data on the basis of the data bits D0 to D3 furnished by a gate circuit 24 and a skip signal e furnished by a skip circuit 25.

The gate circuit 24 is adapted to obtain the data bits D0 to D3 from all the data bits D0 to D4 stored in the AD register 1 and furnish them by way of the data bus 4 in response to the lowermost four bits reading instruction signal c from the read signal output unit 22. Furthermore, the skip circuit 25 is adapted to obtain the remaining data bit D4, except the data bits D0 to D3 obtained by the gate circuit 24, from all the data bits D0 to D4 of the digital data stored in the AD register 1 and furnish the skip signal e having a value corresponding to the value of the data bit D4 in response to the lowermost four bits reading instruction signal c from the read signal output unit 22.

Figure 2:
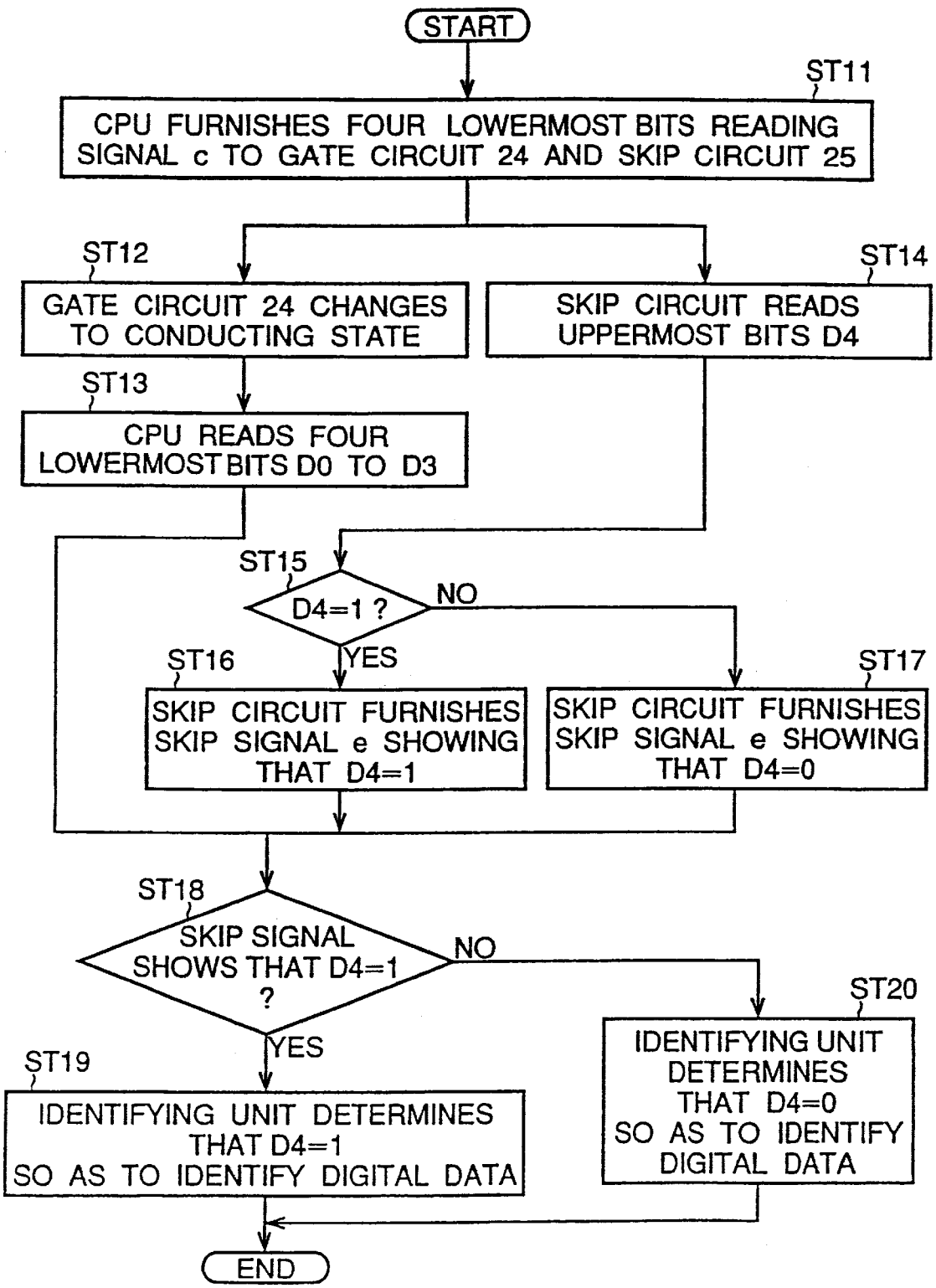
FIG. 2 is a flow diagram showing the operation of the microcomputer according to the first embodiment.
Figure 30:
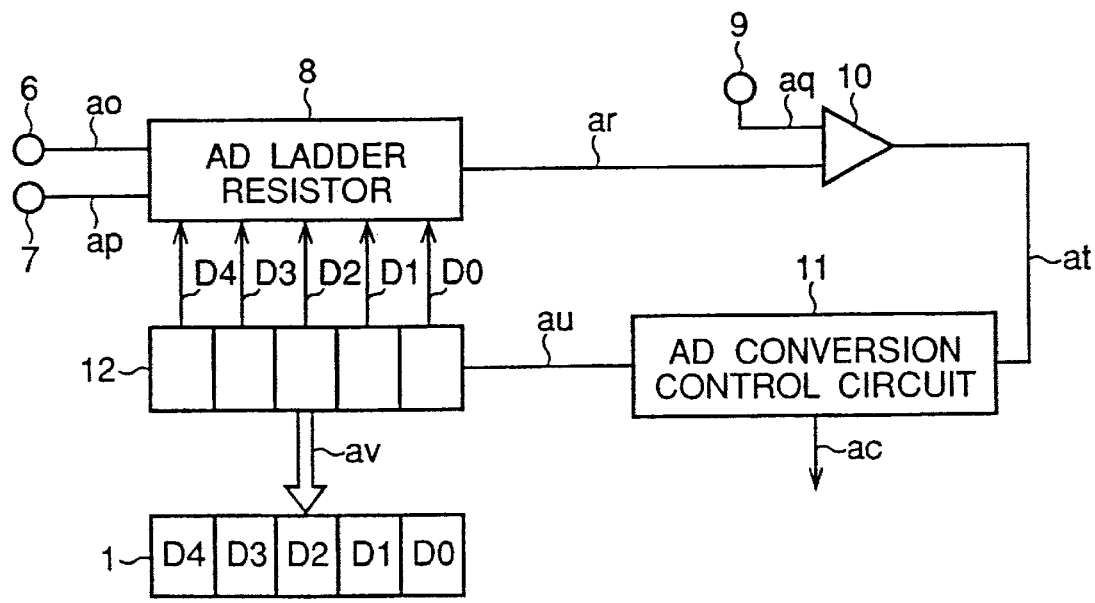
FIG. 30 is a block diagram showing the structure of an AD converter.
Figure 31:
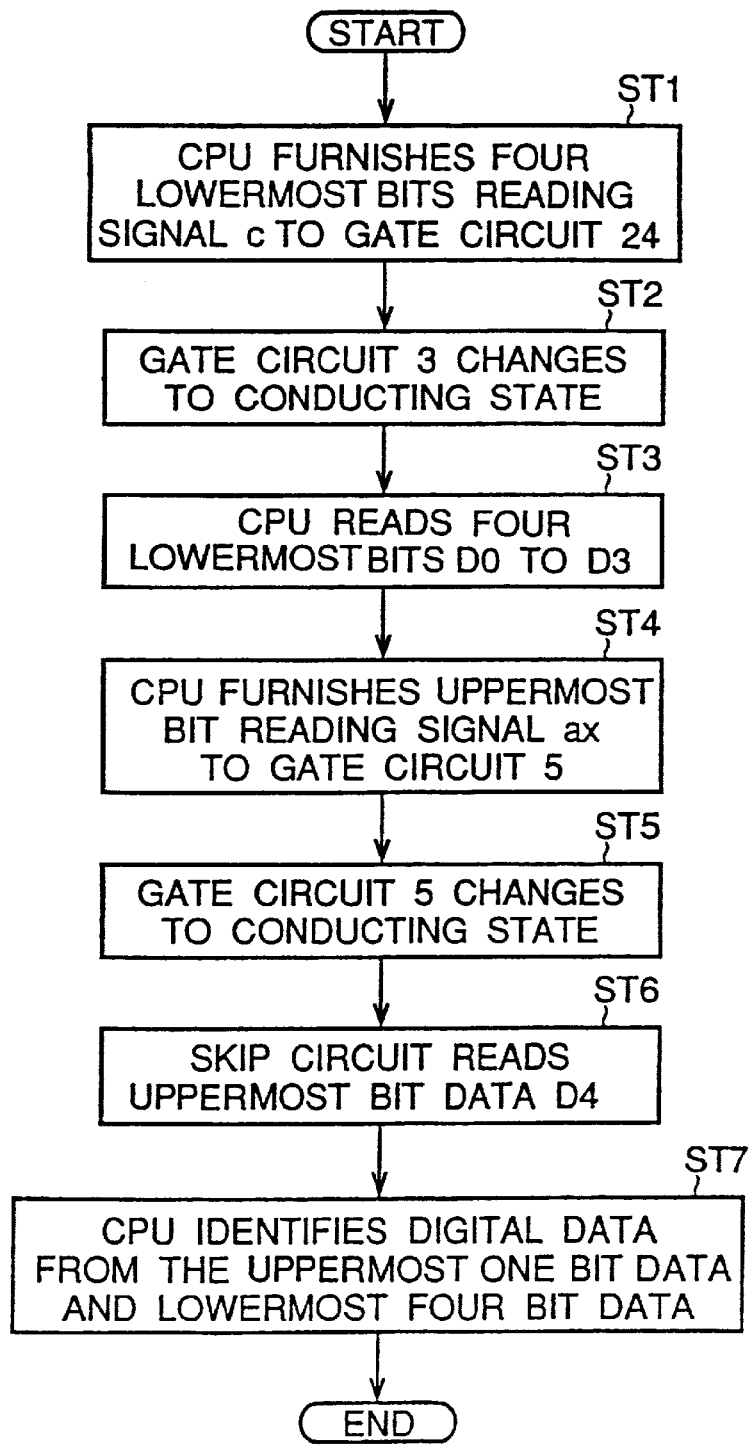
FIG. 31 is a flow diagram showing the operation of the prior art microcomputer shown in FIG. 29.

Referring next to FIG. 2, there is illustrated a flow diagram showing the operation of the microcomputer of this embodiment. As shown in FIG. 30, when the AD converter completes an AD conversion process, a value stored in the successive comparison register 12 is transferred as an AD conversion result to the AD register 1, like the above-mentioned prior art microcomputer. Simultaneously, the AD conversion end signal ac showing that the AD conversion has been completed is furnished to the CPU 21.

In response to the AD conversion end signal ac, the read signal output unit 22 of the CPU 21, in step ST11, furnishes the lowermost four bits reading instruction signal c to both of the gate circuit 24 and skip circuit 25. When the gate circuit 24 receives the lowermost four bits reading instruction signal c, it makes a transition from the nonconducting state to the conducting state in step ST12, and therefore the lowermost four data bits (i.e., data bits D0 to D3) stored in the AD register 1 are delivered by way of the data bus 4. Accordingly, the data identifying unit 23 of the CPU 21, in step ST13, can read the data bits D0 to D3 from the data bus 4.

On the other hand, when the skip circuit 25 receives the lowermost four bits reading instruction signal c, it obtains the remaining data bit D4, except the data bits D0 to D3 obtained by the gate circuit 24, from all the data bits D0 to D4 stored in the AD register 1 so that the data identifying unit 23 can identify the value of the data bit D4, in step ST14.

Then, the skip circuit 25 determines whether or not the value of the data bit D4 is "1", in step ST15. If the value of the data bit D4 is "1", the skip circuit 25, in step ST16, furnishes the skip signal e showing that the value of the data bit D4 is "1", e.g., at "High" state. On the contrary, if the value of the data bit D4 is "0", the skip circuit 25, in step ST17, furnishes the skip signal e showing that the value of the data bit D4 is "0", e.g., at "Low" state.

When the skip circuit 25 thus furnishes the skip signal e, the data identifying unit 23 of the CPU 21 determines whether or not the CPU 21 skips an instruction included in a software program to be executed next according to the value of the skip signal e. That is, when the data identifying unit 23 receives the skip signal e, it determines whether or not the skip signal e shows that the value of the data bit D4 is "1", i.e., the skip signal e is at "High" state, in step ST18. If the skip signal e is at "High" state, the data identifying unit 23 determines that the uppermost data bit D4 of the digital data is "1" and then allows the CPU to skip an instruction to be executed next and execute an instruction included in the software program that can perform a predetermined data process on the lowermost four data bits of the digital data, in step ST19. On the contrary, if the skip signal e is at "Low" state, the data identifying unit 23 determines that the uppermost data bit D4 of the digital data is "0" and then allows the CPU to execute an instruction in the software program that can perform a predetermined data process on the lowermost four data bits of the digital data, in step ST20.

More specifically, when the data identifying unit 23, determines that the uppermost data bit D4 is "1", the CPU skips a jump instruction to be executed next and then executes an instruction that can perform a predetermined data process on the lowermost four data bits D0 to D3.

Alternatively, the CPU 21 can execute an instruction that performs a predetermined data process on the digital data comprised of all the data bits D0 to D4. On the other hand, when the data identifying unit 23 determines that the bit data D4 is "0", the CPU executes the next jump instruction and then executes an instruction designated by the jump instruction, which can perform another predetermined data process on the lowermost four data bits D0 to D3. That is, the uppermost one bit data D4 is used in order for the data identifying unit 23 to determine whether or not it causes a branch to location other than the location of a statement following the jump statement.

As previously explained, the microprocessor according to the first embodiment is constructed such that when the read signal output unit 22 furnishes the lowermost four bits reading instruction signal c, the skip circuit 25 obtains the data bit D4 other than the plurality of data bits D0 to D3 obtained by the gate circuit 24 from among all the data bits D0 to D4 of digital data stored in the AD register 1 and then furnishes the skip signal e having a value which corresponds to the value of the data bit D4 to the CPU. Therefore, this embodiment offers the advantage of being able to promptly identify the value of the digital data, which is an AD conversion result, stored in the AD register 1, even though the number of bits of the digital data exceeds the number of bits that can be read at one time by the CPU 21.

Figure 3:
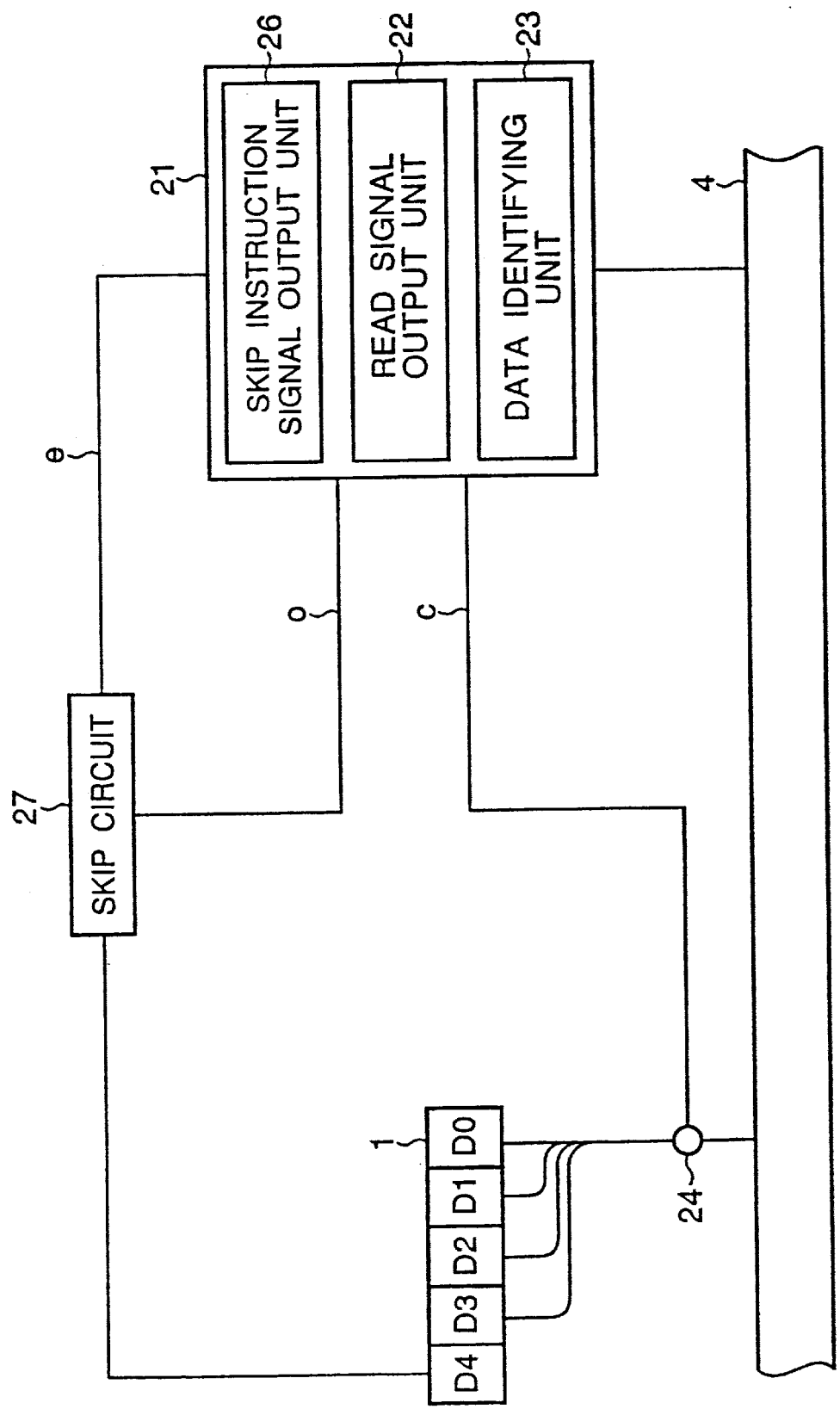
FIG. 3 is a block diagram showing the structure of a microcomputer according to a second embodiment of the present invention.

Referring next to FIG. 3, there is illustrated a block diagram showing the structure of a microcomputer according to a second embodiment of the present invention. In the figure, the same reference numerals as those shown in FIG. 1 denote the same or like components, and therefore the description about the components will be omitted hereinafter.

In FIG. 3, reference numeral 26 denotes a skip instruction signal output unit which can furnish a skip instruction signal o when the CPU 21 executes a skip instruction in the software program, and 27 denotes a skip circuit which can obtain the uppermost data bit D4, except the data bits D0 to D3 obtained by the gate circuit 24, from all the data bits D0 to D4 of digital data stored in the AD register 1 and furnish a skip signal e having a value corresponding to the value of the data bit D4.

In the above-mentioned first embodiment, the read signal output unit 22 of the CPU 21 is adapted to furnish the lowermost four bits reading signal c to both of the gate circuit 24 and the skip circuit 25. The microcomputer according to the second embodiment differs from the first embodiment in that the read signal output unit 22 is adapted to furnish the lowermost four bits reading signal c to only the gate circuit 24.

Figure 4:
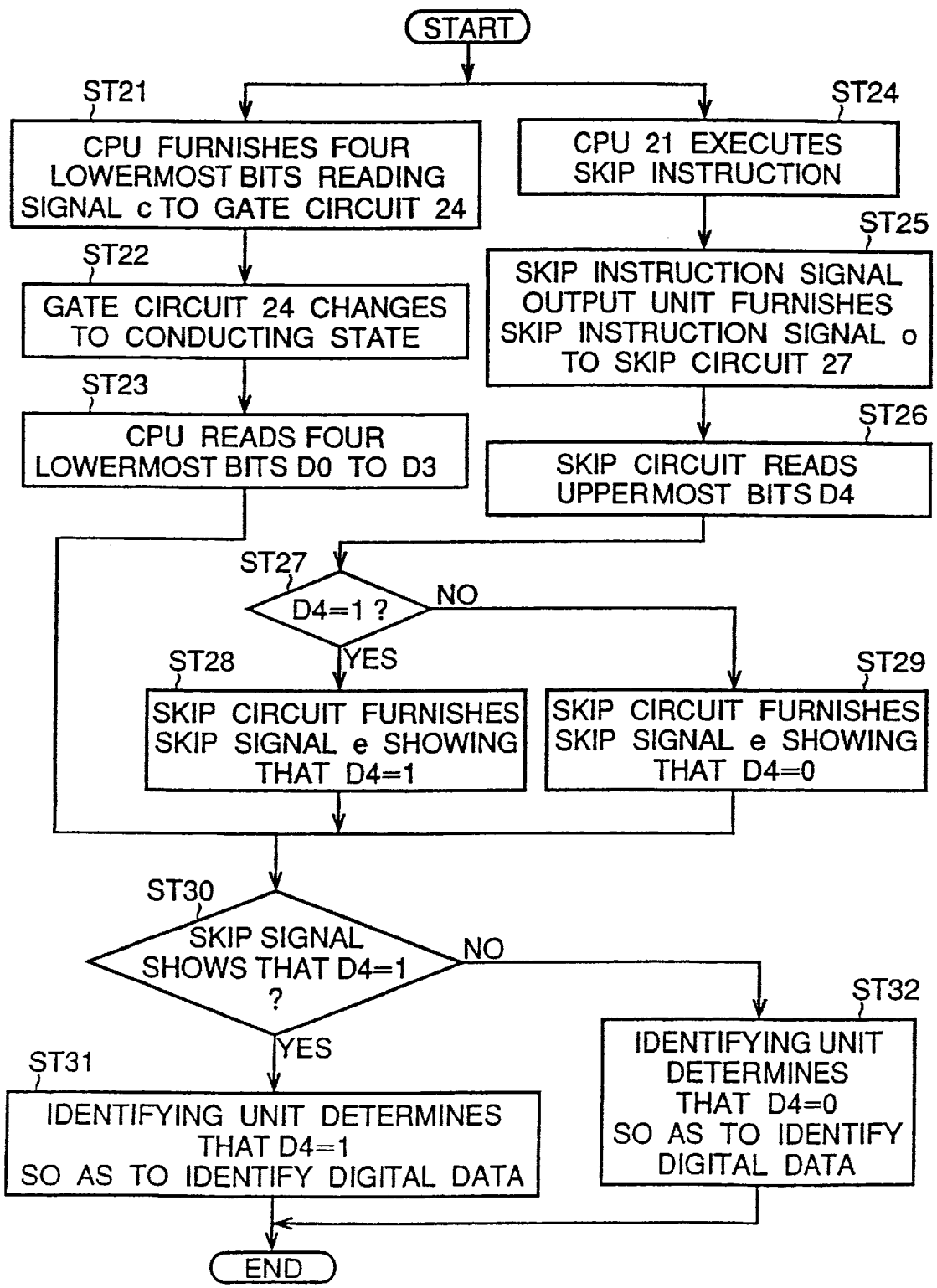
FIG. 4 is a flow diagram showing the operation of the microcomputer according to the second embodiment.

Referring next to FIG. 4, there is illustrated a flow diagram showing the operation of the microcomputer of this embodiment. When the AD conversion control circuit 11 furnishes the AD conversion end signal ac, the read signal output unit 22 of the CPU 21, in step ST21, furnishes the lowermost four bits reading instruction signal c to the gate circuit 24, like the above-mentioned first embodiment, but does not furnish the lowermost four bits reading instruction signal c to the skip circuit 27. When the CPU 21, in step ST24, executes a skip instruction in the software program that forces the CPU 21 to furnish the skip instruction signal o, the skip instruction signal output unit 26 furnishes the skip instruction signal o to the skip circuit 27, in step ST25.

When the skip circuit 27 thus receives the skip instruction signal o, it obtains the uppermost data bit D4, except the bit data D0 to D3 which are obtained by the gate circuit 24, from all the bit data D0 to D4 of digital data stored in the AD register 1 so that the data identifying unit 23 can identify the value of the uppermost data bit D4, in step ST26, similarly to the skip circuit 25 of the first embodiment as shown in FIG. 1.

Then, the skip circuit 27 determines whether or not the value of the bit data D4 is "1", in step ST27. If the value of the bit data D4 is "1", the skip circuit 27, in step ST28, furnishes the skip signal e showing that the value of the data bit D4 is "1", e.g., at "High" state. On the contrary, if the value of the bit data D4 is "0", the skip circuit 27, in step ST29, furnishes the skip signal e showing that the value of the data bit D4 is "0", e.g., at "Low" state.

Since the following steps ST30 to ST32 are the same as steps ST18 to ST20 shown in FIG. 2 of the above-mentioned first embodiment, the description about the steps will be omitted hereinafter.

As previously explained, the microprocessor according to the second embodiment is constructed such that when the skip instruction signal output unit 26 furnishes the skip instruction signal o, the skip circuit 27 obtains the uppermost data bit D4 other than the bit data D0 to D3 obtained by the gate circuit 24 from among the bit data D0 to D4 of digital data stored in the AD register 1, and then furnishes the skip signal e having a value which corresponds to the value of the bit data D4 to the CPU. Therefore, like the above-mentioned first embodiment, this embodiment offers the advantage of being able to promptly identify the value of digital data, which is an AD conversion result, stored in the AD register 1, even though the number of bits of the digital data exceeds the number of bits that can be read at a time by the CPU 21.

Furthermore, the embodiment offers the advantage of being able to identify the value of digital data, which is an AD conversion result, only when the software program needs the AD conversion result, because the skip circuit 27 furnishes the skip signal e when the CPU 21 executes a skip instruction.

Figure 5:
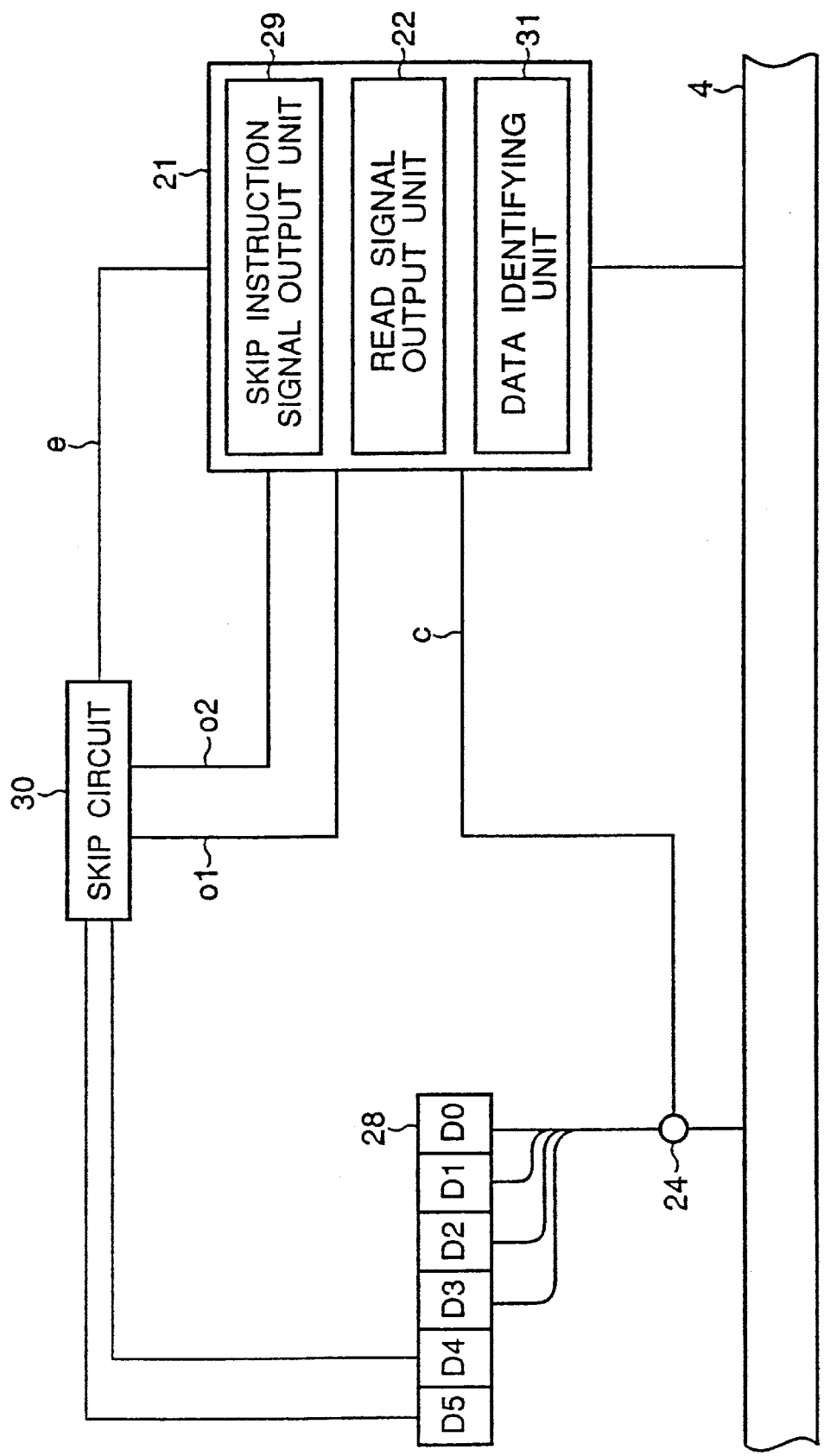
FIG. 5 is a block diagram showing the structure of a microcomputer according to a third embodiment of the present invention.

Referring next to FIG. 5, there is illustrated a block diagram showing the structure of a microcomputer according to a third embodiment of the present invention. In the figure, the same reference numerals as those shown in FIG. 3 denote the same or like components, and therefore the description about the components will be omitted hereinafter.

In FIG. 5, reference numeral 28 denotes an AD register disposed in the AD converter, for storing digital data which is an AD conversion result obtained by the AD converter as a set of a plurality of data bits D0 to D5, 29 denotes a skip instruction signal output unit which can furnish skip instruction signals o1 and o2 when the CPU 21 executes a skip instruction in the software program, 30 denotes a skip circuit which can obtain the two data bits D4 and D5 at the high-order end of the digital data, except the data bits D0 to D3 obtained by the gate circuit 24, from all the bit data D0 to D5 of digital data stored in the AD register 28 and furnish a skip signal e having a value which differs according to the values of the data bit D4 and D5, and 31 denotes a data identifying unit which can identify the value of the digital data on the basis of the data bits D0 to D3 furnished by the gate circuit 24 and the skip signal e furnished by the skip circuit 30.

In the above-mentioned second embodiment, the skip circuit 27 is adapted to determine whether or not the uppermost data bit, i.e., the data bit D4 is "1" when the skip instruction signal output unit 26 of the CPU 21 furnishes the skip instruction signal o showing that the CPU 21 has executed a skip instruction. By contrast, according to the present embodiment, the skip circuit 30 is adapted to check the values of the two data bits D4 and D5 at the high end of the digital data stored in the 6-bit AD register 28 so as to generate the skip signal e when it receives the two skip instruction signals o1 and o2 from the skip instruction signal output unit 29.

When the CPU 21 executes a skip instruction, the skip instruction signal output unit 29 of the CPU 21 furnishes the skip instruction signal o1 that the CPU 21 has executed a skip instruction to the skip circuit 30 first. Then, when the skip circuit 30 thus receives the skip instruction signal o1, it obtains the highmost one data bit, i.e., the bit data D5 and determines whether the data bit D5 is "1" or "0" so as to furnish the skip signal e showing the determination result to the data identifying unit 31 of the CPU 21. When the data identifying unit 31 receives the skip signal e, the skip instruction signal output unit 29 furnishes the skip instruction signal o2 to the skip circuit 30.

When the skip circuit 30 receives the skip instruction signal o2, it determines whether the bit data at the second high end of the digital data stored in the register 28, i.e., the data bit D4 is "1" or "0" and then furnishes the skip signal showing the determination result to the data identifying unit 31 of the CPU 21.

When the data identifying unit 31 thus receives the two skip signals e from the skip circuit 30, it can identify the values of the first and second data bits at the high end of the digital data stored in the AD register 28, i.e., the bit data D5 and D4 so as to determine whether or not the CPU 21 skips an instruction in the software program to be executed next according to the values of the two skip signals, so that the CPU can perform a predetermined data process on the digital data according to the values of the skip signals.

Accordingly, this embodiment offers the advantage of being able to promptly identify the value of digital data, which is an AD conversion result, stored in the AD register 28, even though the number of bits of the AD register is six, like the above-mentioned second embodiment.

Figure 6:
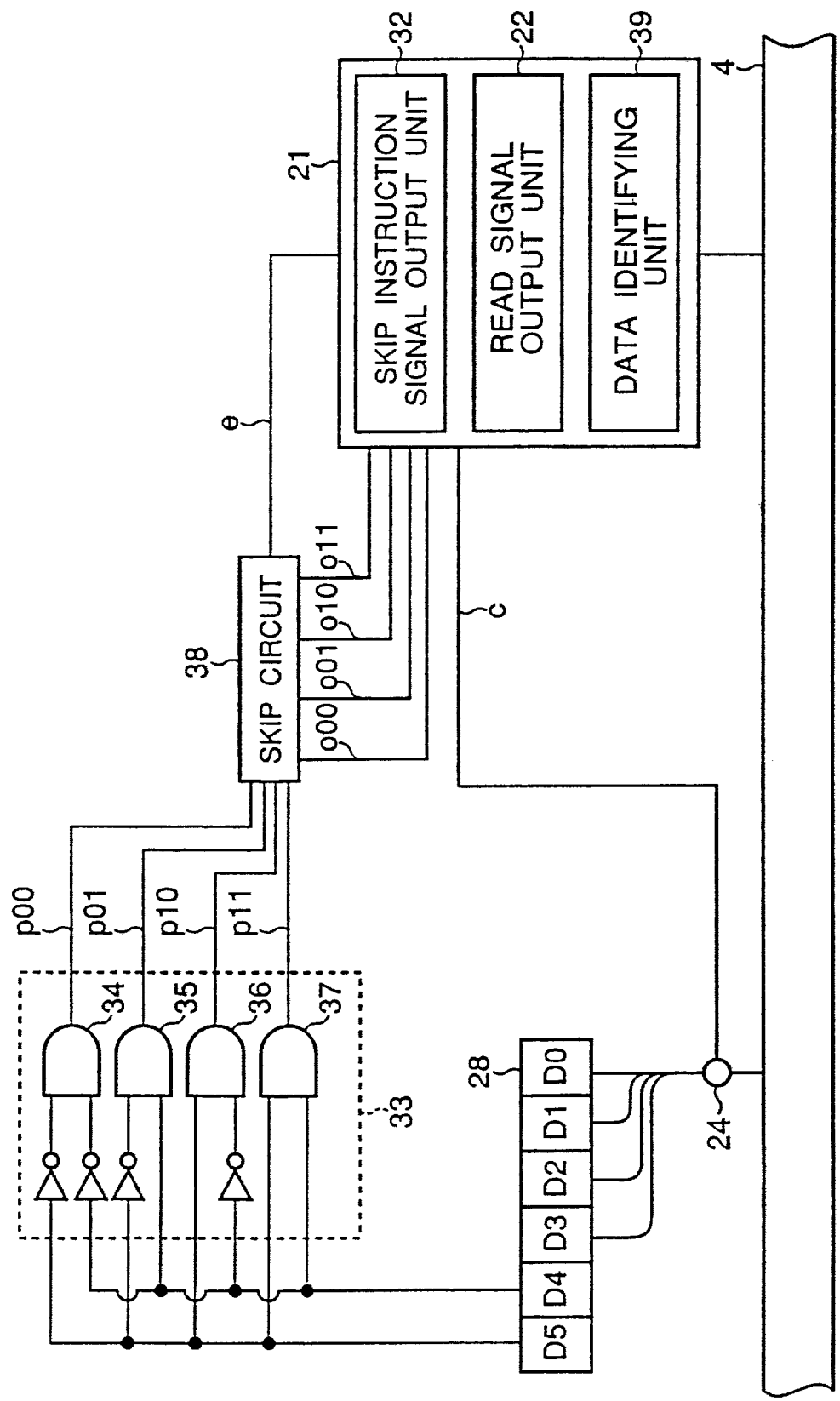
FIG. 6 is a block diagram showing the structure of a microcomputer according to a fourth embodiment of the present invention.

Referring next to FIG. 6, there is illustrated a block diagram showing the structure of a microcomputer according to a fourth embodiment of the present invention. In the figure, the same reference numerals as those shown in FIG. 5 denote the same or like components, and therefore the description about the components will be omitted hereinafter.

In FIG. 6, reference numeral 32 denotes a skip instruction signal output unit which, when the CPU 21 executes a skip instruction in the software program, can furnish either one of skip instruction signals o00, o01, o10, and o11 according to the type or contents of the skip instruction, 33 denotes a decode circuit which can assert and furnish either one of signals p00, p01, p10, and p11 according to the values of the data bits D5 and D4, 34 denotes an AND gate which can furnish the signal p00 at "High" state when the values of the data bits D5 and D4 are "00", 35 denotes an AND gate which can furnish the signal p01 at "High" state when the values of the data bits D5 and D4 are "01", 36 denotes an AND gate which can furnish the signal p10 at "High" state when the values of the data bits D5 and D4 are "10", 37 denotes an AND gate which can furnish the signal p11 at "High" state when the values of the data bits D5 and D4 are "11", 38 denotes a skip circuit which can furnish the skip signal e having a value which differs according to which one of the skip instruction signals o00, o01, o10, and o11 is asserted by the decode circuit 33, and 39 denotes a data identifying unit which can identify the value of the digital data on the basis of the plurality of data bits D0 to D3 furnished by the gate circuit 24 and the skip signal e furnished by the skip circuit 38.

In the above-mentioned third embodiment, the skip circuit is adapted to furnish the two skip signals having values which correspond to the two skip instruction signals o1 and o2, respectively. By contrast, according to the present embodiment, the skip circuit 38 is adapted to furnish the skip signal e having a value which differs according to whether it receives the skip instruction signal o00, o01, o10, or o11.

The decode circuit 33 can furnish the signals p00 to p11 having values which differ according to the values of the data bits D5 and D4, as shown in FIGS. 7 to 10, to the skip circuit 38. For example, when the data bits D4 is "0" and the data bit D5 is "0", the decode circuit 33 furnishes the signal p00 at "High" state. At all other times, the decode circuit 33 furnishes the signal p00 at "Low" state.

When the CPU executes a skip instruction, the skip instruction signal output unit 32 furnishes either one of the skip instruction signals according to the type or contents of the skip instruction as follows:

(1) if the CPU executes a skip instruction that can force the skip instruction signal output unit 32 to furnish the skip instruction signal o00, the skip instruction signal output unit 32 furnishes the skip instruction signal o00

(2) if the CPU executes another skip instruction that can force the skip instruction signal output unit 32 to furnish the skip instruction signal o01, the skip instruction signal output unit 32 furnishes the skip instruction signal (3) if the CPU executes another skip instruction that can force the skip instruction signal output unit 32 to furnish the skip instruction signal o10, the skip instruction signal output unit 32 furnishes the skip instruction signal o10

(4) if the CPU executes another skip instruction that can force the skip instruction signal output unit 32 to furnish the skip instruction signal o11, the skip instruction signal output unit 32 furnishes the skip instruction signal o11.

When the skip circuit 38 receives either one of the skip instruction signals o00 to o11, it checks the level of either one of the signals p00, p01, p10, and p11 which corresponds to the skip instruction executed and furnishes the skip signal e having a value which corresponds to the level of either one of the signals p00, p01, p10, and p11. For example, in the case where the signal p00 is at "High" state, when the skip circuit 38 receives the skip instruction signal o00 from the skip instruction signal output unit 32, it furnishes the skip signal e showing that the signal p00 is at "High" state. In this case, even if the skip circuit 38 receives one of the other skip instruction signals o01, o10, and o11, it furnishes the skip signal e showing that the signals p01, p10, and p11 are at "Low" state rather than the skip signal e showing that the signal p00 is at "High" state. Accordingly, the data identifying unit 39 can recognize that the values of the data bits D5 and D4 are "00".

Accordingly, this embodiment offers the advantage of being able to promptly identify the value of digital data, which is an AD conversion result, stored in the AD register 28, even though the number of bits of the AD register is six, like the above-mentioned third embodiment.

Figure 11:
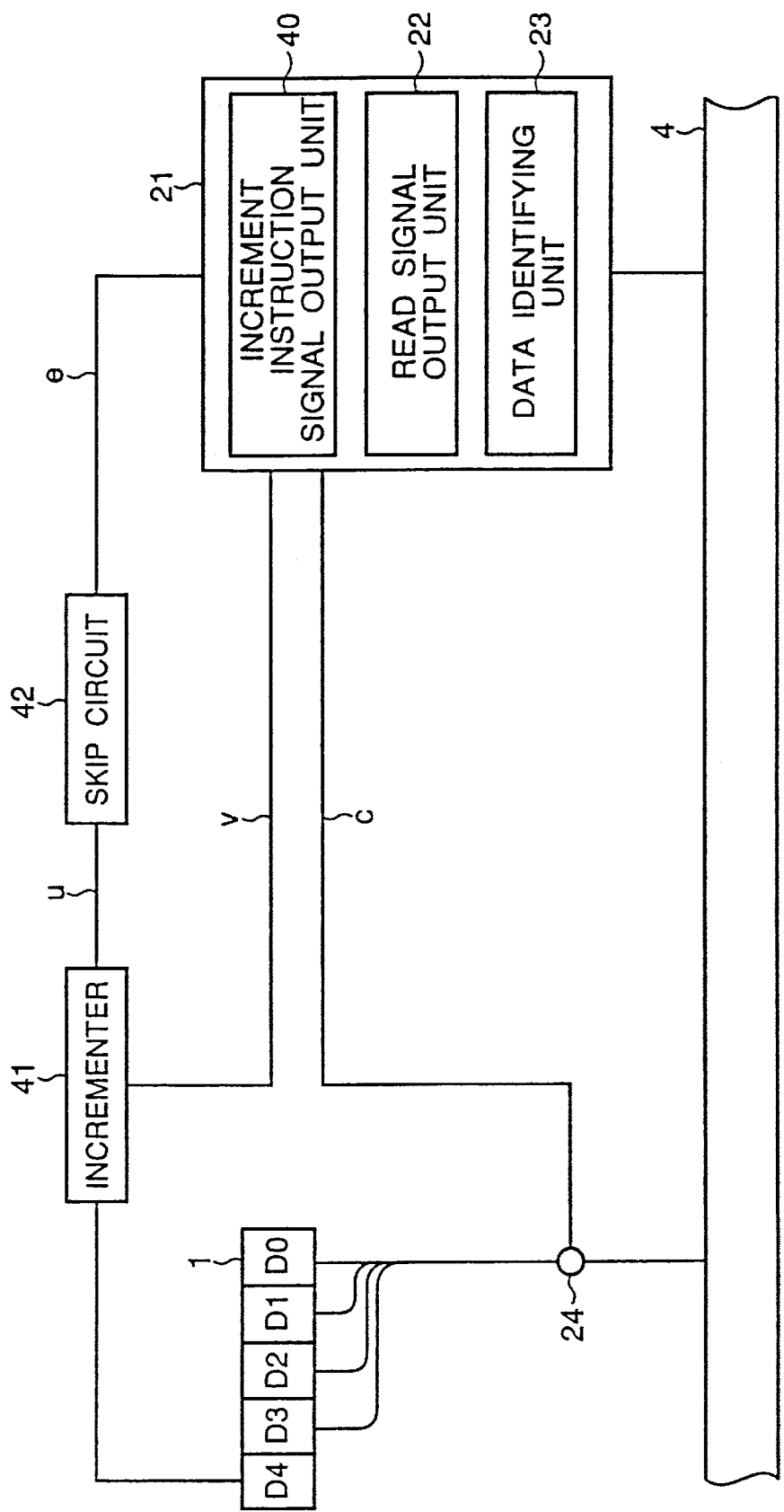
FIG. 11 is a block-diagram showing the structure of a microcomputer according to a fifth embodiment of the present invention.

Referring next to FIG. 11, there is illustrated a block diagram showing the structure of a microcomputer according to a fifth embodiment of the present invention. In the figure, the same reference numerals as those shown in FIG. 1 denote the same or like components, and therefore the description about the components will be omitted hereinafter.

In FIG. 11, reference numeral 40 denotes an increment instruction signal output unit which, when the CPU 21 executes an increment instruction in the software program, furnishes an increment instruction signal v, 41 denotes an incrementer, responsive to the increment instruction signal v from the increment instruction signal output unit 40, for obtaining the uppermost data bit D4 other than the data bits D0 to D3 from among all the data bits D0 to D4 of digital data stored in the AD register 1 to increment its count value and then furnish a carry signal showing whether or not a carry has occurred, and 42 denotes a skip circuit which can furnish a skip signal having a value which differs according to the value of the carry signal u.

In the above-mentioned first embodiment, the skip circuit 25 is adapted to furnish the skip signal e having a value which differs according to the value of the uppermost data bit D4 in response to the lowermost four bits reading instruction signal c. By contrast, the skip circuit 42 according to the present embodiment is adapted to furnish the skip signal e having a value which differs according to the value of the carry signal u when it receives the carry signal u from the incrementer 41.

When the CPU 21 executes an increment instruction during the program's execution, the increment instruction signal output unit 40 of the CPU 21 furnishes the increment instruction signal v to the incrementer 41. Then, when the incrementer 41 receives the increment instruction signal v, it increments the value of the uppermost data bit, i.e., the data bit D4 by "1".

To be more specific, if the value of the data bit is "0", it is incremented to "01B". In this case, a carry does not occur. On the contrary, if the value of the bit data is "1", it is incremented to "10B". In this case, a carry occurs. When the increment results in an occurrence of a carry occurs from the high-order position, the incrementer 41 furnishes the carry signal u showing that a carry has occurred. On the other hand, when a carry does not occur from the high-order position, the incrementer 41 furnishes the carry signal u showing that a carry has not occurred.

When the incrementer 41 thus furnishes the carry signal u, the skip circuit 42 delivers the skip signal e having a value which differs according to the value of the carry signal u. More specifically, if the carry signal u shows that a carry has occurred out of the high-order position, the skip circuit 42 delivers the skip signal e showing that the value of the data bit D4 is "1", e.g., the skip signal at "High" state. On the other hand, when the carry signal u shows that a carry has not occurred out of the high-order position, the skip circuit 42 delivers the skip signal e showing that the value of the data bit D4 is "0", e.g., the skip signal at "Low" state.

Accordingly, the data identifying unit 23 can promptly identify the value of the data bit D4 at the same time that it identifies the lowermost four data bits D0 to D3. Therefore, this embodiment can offer the same advantage as that provided by the above-mentioned first embodiment.

Figure 12:
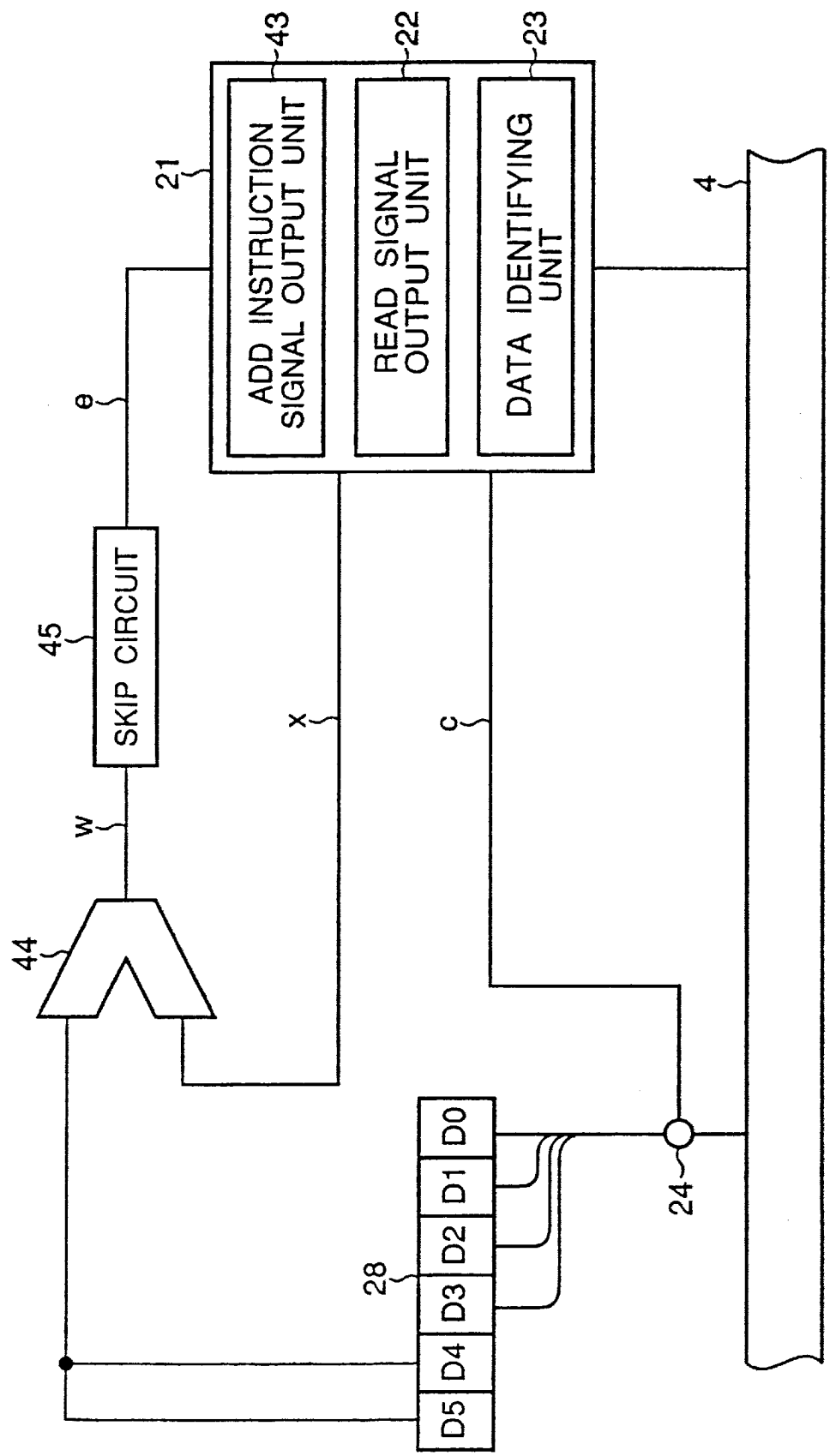
FIG. 12 is a block diagram showing the structure of a microcomputer according to a sixth embodiment of the present invention.

Referring next to FIG. 12, there is illustrated a block diagram showing the structure of a microcomputer according to a sixth embodiment of the present invention. In the figure, the same reference numerals as those shown in FIG. 11 denote the same or like components, and therefore the description about the components will be omitted hereinafter.

In FIG. 11, reference numeral 43 denotes an add instruction signal output unit which, when the CPU executes an add instruction in the software program, furnishes an add instruction signal x, 44 denotes an adder, responsive to the add instruction signal x from the add instruction signal output unit 43, for obtaining the uppermost two data bits D5 and D4 other than the data bits D0 to D3 from among all the data bits D0 to D5 of digital data stored in the AD register 28 to add a predetermined value to the 2-bit binary data comprised of the bit data D5 and D4 and then furnish a carry signal w showing whether or not a carry has occurred, and 45 denotes a skip circuit which can furnish a skip signal having a value which differs according to the value of the carry signal w.

The microcomputer according to this embodiment is adapted to identify the uppermost two data bits D5 and D4 and the lowermost four data bits D3 to D0 of 6-bit digital data stored in the AD register 28 at the same time by means of the add circuit 44 and skip circuit 45.

When the CPU 21 executes an add instruction during the program's execution, the add instruction signal output unit 43 of the CPU 21 furnishes the add instruction signal x to the add circuit 44. Then, when the add circuit 44 receives the add instruction signal x, it adds the predetermined value to the 2-bit binary data comprised of the two uppermost data bits, i.e., the data bits D5 and D4. The predetermined value can be included in the add instruction signal x delivered to the add circuit 44 by the add instruction signal output unit 43.

To be more specific, the add instruction signal output unit 43 executes an add instruction to add a predetermined value "01B" first. Then, according to the instruction, the add circuit 44 adds the predetermined value "01B" to the 2-bit binary data comprised of the uppermost two data bits D5 and D4. In this case, a carry occurs out of the high-order position, if the 2-bit binary data is "11B". There does not occur a carry otherwise.

When the add circuit 44 thus furnishes the carry signal w showing whether or not a carry has occurred, the skip circuit 45 delivers the skip signal e having a value which differs according to the value of the carry signal w. If the carry signal w shows that a carry has occurred out of the high-order position, the skip circuit 45 delivers the skip signal e showing that the value of the 2-bit binary data comprised of the uppermost two data bits D5 and D4 is "11B", e.g., the skip signal at "High" state. On the other hand, when the carry signal w shows that a carry has not occurred out of the high-order position, the skip circuit 45 delivers the skip signal e showing that the value of the 2-bit binary data of D5 and D4 is other than "11B", e.g., the skip signal at "Low" state.

Next, the add instruction signal output unit 43 executes an add instruction to add a predetermined value "10B". Then, according to the instruction, the add circuit 44 adds the predetermined value "10B" to the 2-bit binary data of D5 and D4. In this case, only if the 2-bit binary data is "10B", a carry occurs out of the high-order position. There does not occur a carry otherwise.

If the carry signal w shows that a carry has occurred out of the high-order position, the skip circuit 45 delivers the skip signal e showing that the value of the 2-bit binary data of D5 and D4 is "10B", e.g., the skip signal is at "High" state. On the other hand, when the carry signal w shows that a carry has not occurred out of the high-order position, the skip circuit 45 delivers the skip signal e showing that the value of the 2-bit binary data of D5 and D4 is other than "10B", e.g., the skip signal at "Low" state.

Next, the add instruction signal output unit 43 executes an add instruction to add a predetermined value "11B". Then, according to the instruction, the add circuit 44 adds the predetermined value "11B" to the 2-bit binary data of D5 and D4. In this case, only if the 2-bit binary data of D5 and D4 is "01B", a carry occurs out of the high-order position. There does not occur a carry otherwise.

If the carry signal w shows that a carry has occurred out of the high-order position, the skip circuit 45 delivers the skip signal e showing that the value of the 2-bit binary data of D5 and D4 is "01B", e.g., the skip signal at "High" state. On the other hand, when the carry signal w shows that a carry has not occurred out of the high-order position, the skip circuit 45 delivers the skip signal e showing that the value of the 2-bit binary data of D5 and D4 is "00B", e.g., the skip signal at "Low" state.

Accordingly, the data identifying unit 23 can promptly identify the values of the data bits D5 and D4 at the same time that it identifies the lowermost four data bits D0 to D3 even though the AD register 28 is comprised of 6 bits, like the above-mentioned fifth embodiment.

Figure 13:
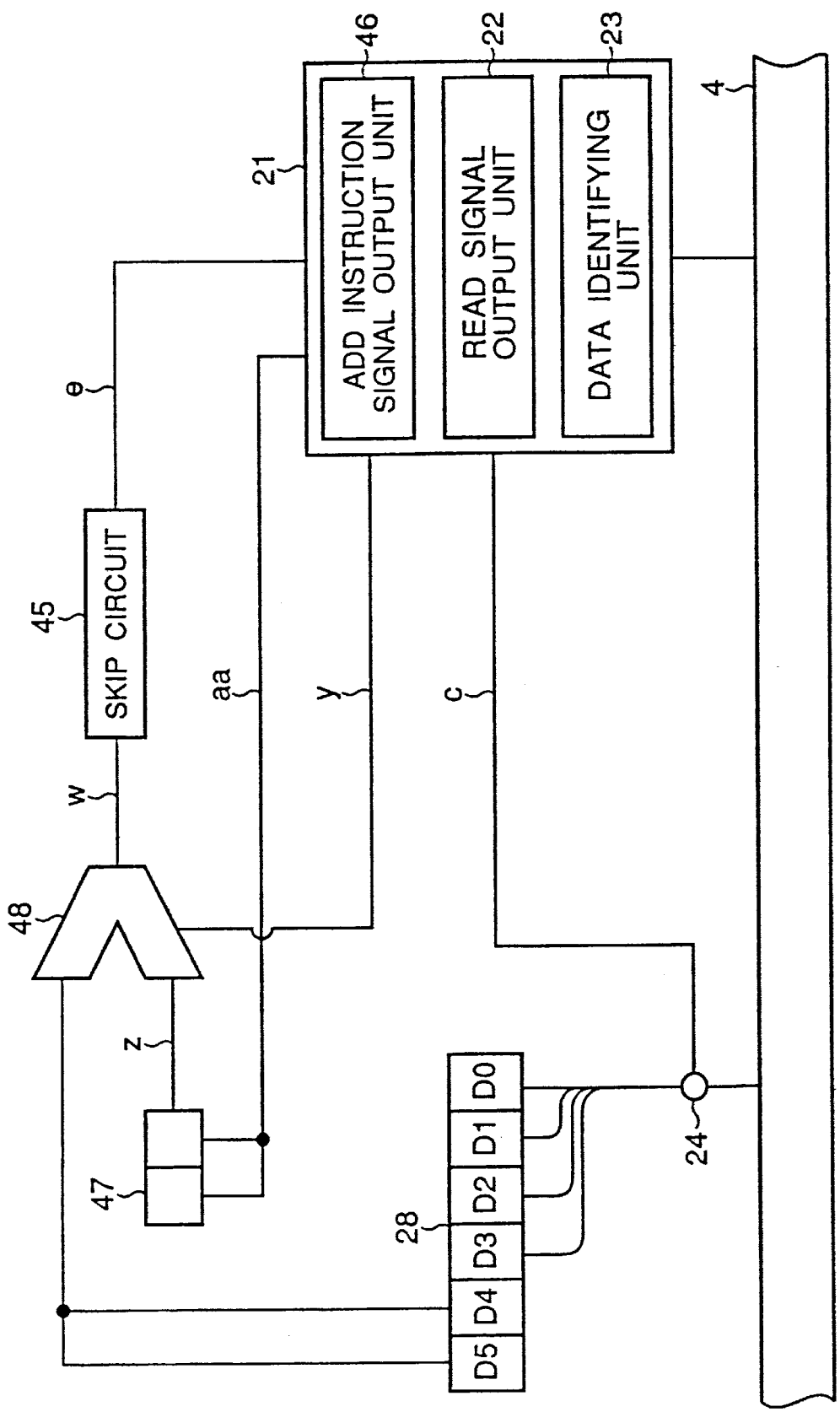
FIG. 13 is a block diagram showing the structure of a microcomputer according to a seventh embodiment of the present invention.

Referring next to FIG. 13, there is illustrated a block diagram showing the structure of a microcomputer according to a seventh embodiment of the present invention. In the figure, the same reference numerals as those shown in FIG. 12 denote the same or like components, and therefore the description about the components will be omitted hereinafter.

In FIG. 13, reference numeral 46 denotes an add instruction signal output unit which can furnish an adder register setting signal aa for writing a predetermined value z to be added to the 2-bit binary data of the data bits D5 and D4 into an adder register 47 in advance of delivering an add instruction signal y and furnish the add instruction signal y when the CPU 21 executes an add instruction in the software program, and 48 denotes an adder, responsive to the add instruction signal y from the add instruction signal output unit 46, for obtaining the uppermost two bit data D5 and D4 other than the bit data D0 to D3 from among all the bit data D0 to D5 of digital data stored in the AD register 28 to add the predetermined value z stored in the adder register 47 to the 2-bit binary data comprised of the uppermost two data bits D5 and D4 and then furnish a carry signal w showing whether or not a carry has occurred.

In the above-mentioned sixth embodiment, the add instruction signal output unit 43 is adapted to add an addend, i.e., a predetermined value to the add instruction signal x and then furnish it. By contrast, according to the present embodiment, the add instruction signal output unit 46 is adapted to furnish the adder register setting signal aa in order to write the addend z into the adder register 47 in advance of delivering the add instruction signal to the adder 48, as shown in FIG. 13. When the add instruction signal output unit 46 furnishes the add instruction signal y to the add circuit 48, the add circuit 48 reads the addend z stored in the adder register 47 so as to add the addend z to the 2-bit binary data comprised of the uppermost two data bits D5 and D4. Therefore, this embodiment offers the same advantage as that provided by the aforementioned sixth embodiment.

Figure 14:
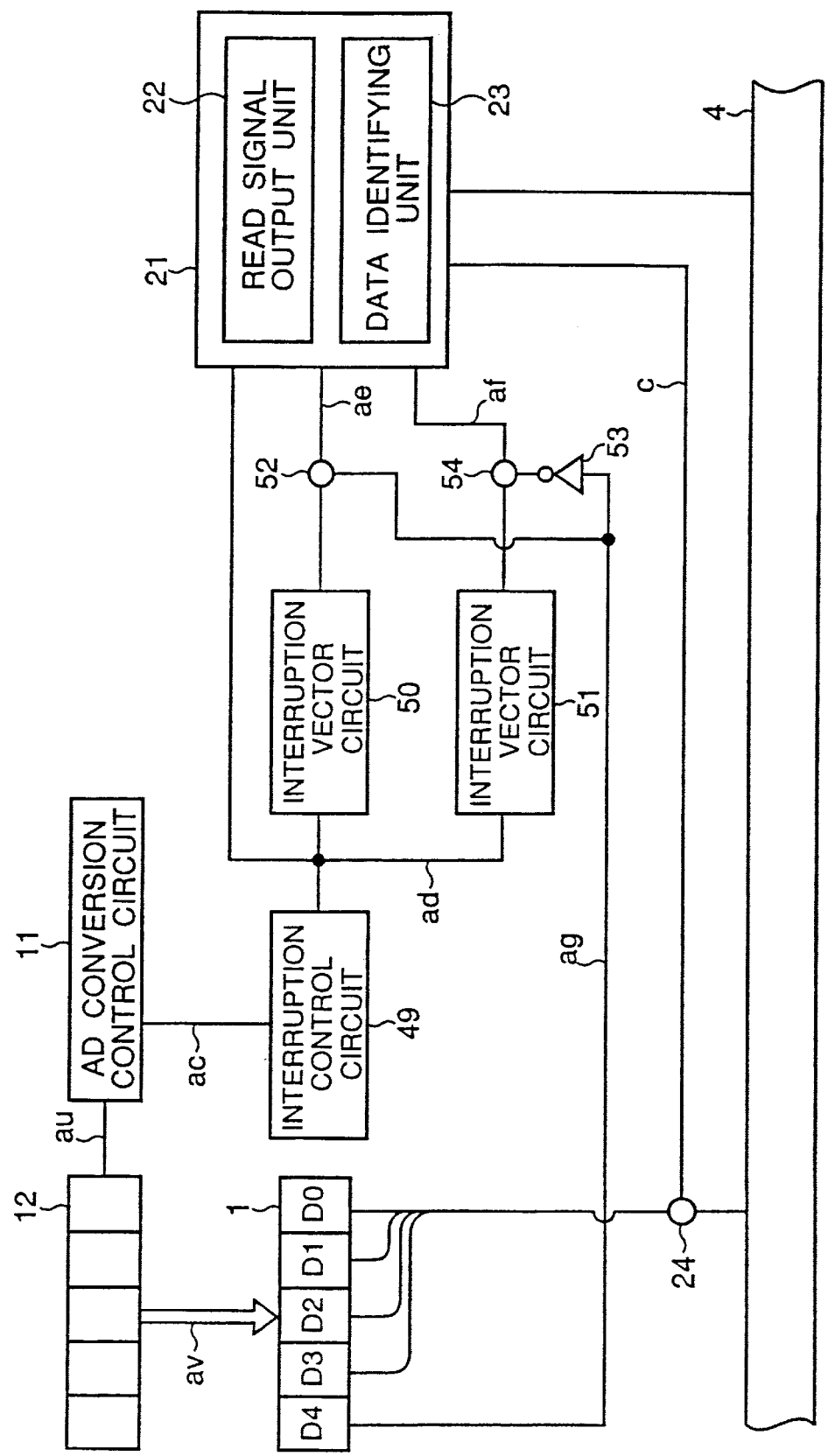
FIG. 14 is a block diagram showing the structure of a microcomputer according to an eighth embodiment of the present invention.

Referring next to FIG. 14, there is illustrated a block diagram showing the structure of a microcomputer according to an eighth embodiment of the present invention. In the figure, the same reference numerals as those shown in FIG. 1 denote the same or like components, and therefore the description about the components will be omitted hereinafter.

In FIG. 14, reference numeral 11 denotes an AD conversion control circuit disposed in the AD converter, for furnishing an AD conversion end signal ac when AD conversion is completed, 49 denotes an interruption control circuit, responsive to the AD conversion end signal ac from the AD conversion control circuit 11, for furnishing an interruption signal ad, 50 denotes an interruption vector circuit, responsive to the interruption signal ad from the interruption control circuit 49, for furnishing an interruption address ae, 51 denotes an interruption vector circuit, responsive to the interruption signal ad from the interruption control circuit 49, for furnishing an interruption address af, 52 denotes a gate circuit which makes a transition to the conducting state when the value of the uppermost data bit D4 of digital data stored in the AD register 1 is "1", 53 denotes an inverter which can invert the value of the data bit D4, and 54 denotes a gate circuit which makes a transition to the conducting state when the value of the data bit D4 is "0".

In the above-mentioned first embodiment, the microcomputer is constructed such that when the read signal output unit furnishes the lowermost four bits reading instruction signal c, the skip circuit 25 furnishes the skip signal e having a value which differs according to the value of the bit data D4. By contrast, the microcomputer according to the present embodiment is constructed such that the interruption vector circuit 50 can furnish the interruption address ae according, to the value of the bit data D4 when the AD conversion control circuit 11 furnishes the AD conversion end signal ac.

When the AD conversion is completed, the read signal output unit 22 furnishes the lowermost four bits reading instruction signal c to the gate circuit 24 so that the data identifying unit 23 of the CPU 21 can read the values of the lowermost four data bits, i.e., the four data bits D0 to D3 stored in the AD register 1, like the above-mentioned first embodiment.

Simultaneously, the data identifying unit 23 of the CPU 21 can obtain and identify the value of the uppermost data bit D4 in the following manner. The interruption control circuit 49 receives the AD conversion end signal ac furnished by the AD conversion control circuit 11 at the completion of the AD conversion. As a result, the interruption control circuit 49 furnishes the interruption signal ad to the CPU 21 and the interruption vector circuits 50 and 51. Thus, the CPU 21 can recognize the completion of the AD conversion while the interruption vector circuits 50 and 51 furnish the interruption addresses ae and af specifying an interrupt program to be executed by the data identifying unit 23 of the CPU 21, respectively.

Since both of the interruption vector circuits 50 and 51 are adapted to furnish the respective addresses to the CPU 21, it is necessary to determine whether the CPU 21 uses the interruption address ae or af. To this end, the microcomputer is adapted to furnish either one of the interruption addresses ae and af to the CPU 21 according to the value of the uppermost bit data D4. That is, when the value of the data bit D4 is "1", since the gate circuit 52 changes to the conducting state and the gate circuit 54 remains in the nonconducting state because of the inverter 53, the interruption address ae furnished by the interruption vector circuit 50 can be input to the CPU 21.

On the other hand, when the value of the data bit D4 is "0", since the gate circuit 52 remains in the nonconducting state and the gate circuit 54 changes to the conducting state because of the inverter 53, the interruption address af furnished by the interruption vector circuit 51 can be input to the CPU 21.

When the CPU 21 thus receives the interruption signal ad and interruption address ae, the data identifying unit 23 of the CPU 21 determines that the value of the data bit D4 is "1" and then executes an interrupt program specified by the interruption address ae, which can perform a predetermined data process on the lowermost four data bits D0 to D3 of the digital data. On the other hand, when the CPU 21 thus receives the interruption signal ad and interruption address af, the data identifying unit 23 of the CPU 21 determines that the value of the data bit D4 is "0" and then executes an interrupt program specified by the interruption address af, which can perform another predetermined data process on the lowermost four data bits D0 to D3 of the digital data.

As can be apparent from the above description, the eighth embodiment can offer the same advantage as that provided by the first embodiment by the provision of the interruption control circuit 49 and so on instead of the skip circuit 25 of the first embodiment.

Figure 15:
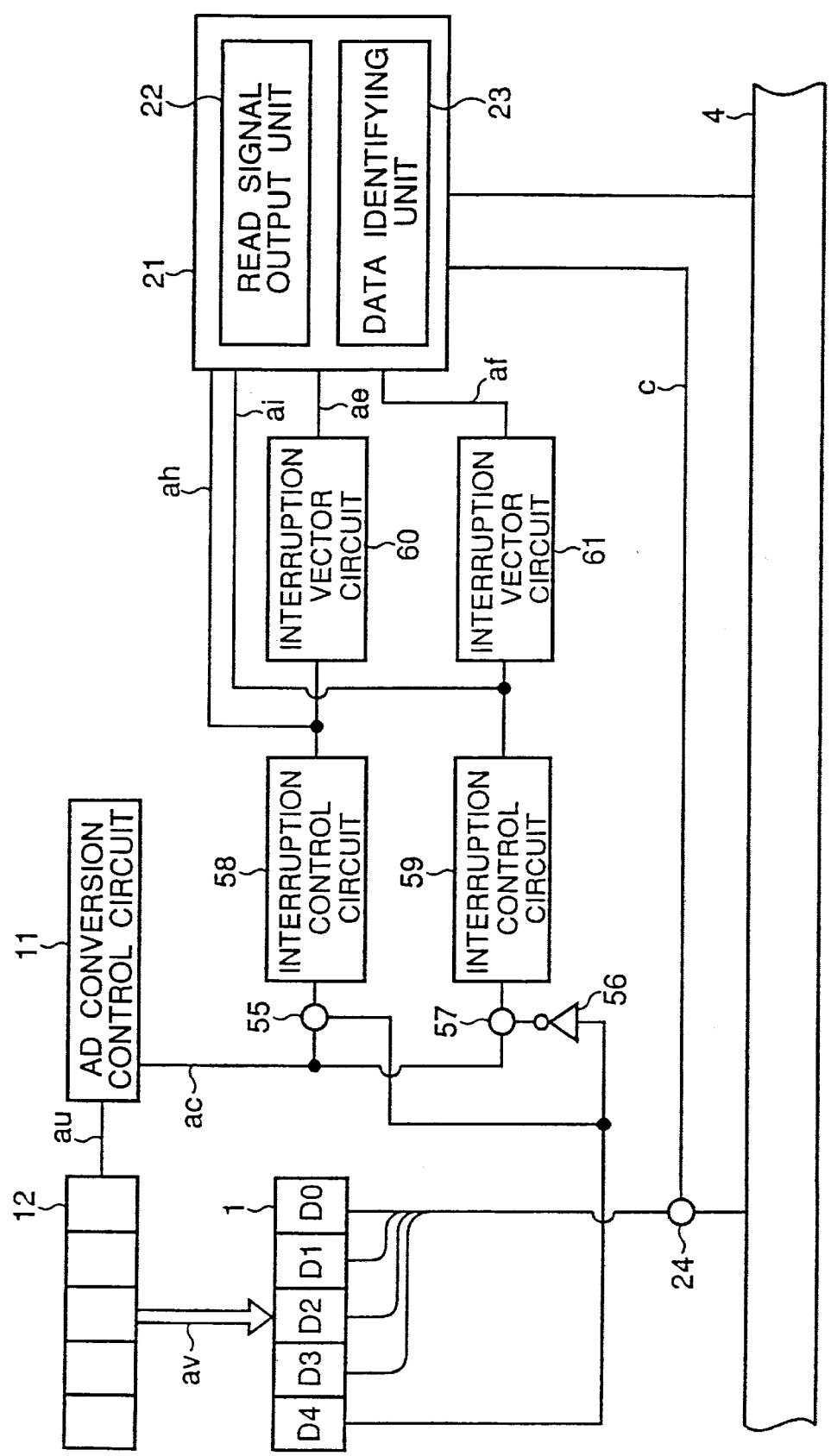
FIG. 15 is a block diagram showing the structure of a microcomputer according to a ninth embodiment of the present invention.

Referring next to FIG. 15, there is illustrated a block diagram showing the structure of a microcomputer according to a ninth embodiment of the present invention. In the figure, the same reference numerals as those shown in FIG. 14 denote the same or like components, and therefore the description about the components will be omitted hereinafter.

In FIG. 15, reference numeral 55 denotes a gate circuit which makes a transition to the conducting state when the value of the uppermost data bit D4 of digital data stored in the AD register 1 is "1", 56 denotes an inverter which can invert the value of the data bit D4, 57 denotes a gate circuit which makes a transition to the conducting state when the value of the data bit D4 is "0", 58 denotes an interruption control circuit, responsive to the AD conversion end signal ac from the AD conversion control circuit 11, for furnishing an interruption signal ah, 59 denotes an interruption control circuit, responsive to the AD conversion end signal ac from the AD conversion control circuit 11, for furnishing an interruption signal ai, 60 denotes an interruption vector circuit, responsive to the interruption signal ah from the interruption control circuit 58, for furnishing an interruption address ae, and 61 denotes an interruption vector circuit, responsive to the interruption signal ai from the interruption control circuit 59, for furnishing an interruption address af.

In the aforementioned eighth embodiment, the gate circuits 52 and 54 are connected to the outputs of the interruption vector circuits 50 and 51, so that the delivery of either one of the interruption addresses ae and af to the CPU 21 can be restricted. By contrast, according to the ninth embodiment, the gate circuits 55 and 57 are connected to the inputs of the interruption control circuits 58 and 59, so that either one of the interruption control circuits 58 and 59 can be disabled to furnish the respective interruption signals ah and ai to the CPU 21 with the result that the delivery of either one of the interruption addresses ae and af from the interruption vector circuits 60 and 61 to the CPU 21 can be restricted. Thus, the present embodiment can offer the same advantage as that provided by the eighth embodiment.

It is needless to say that the functions of the gate circuits 55 and 57 and inverter 56 according to this embodiment make it possible to deliver the interruption address ae furnished by the interruption vector circuit 60 to the CPU 21 when the value of the data bit D4 is "1", and deliver the interruption address af furnished by the interruption vector circuit 61 to the CPU 21 when the value of the bit data D4 is "0".

Figure 16:
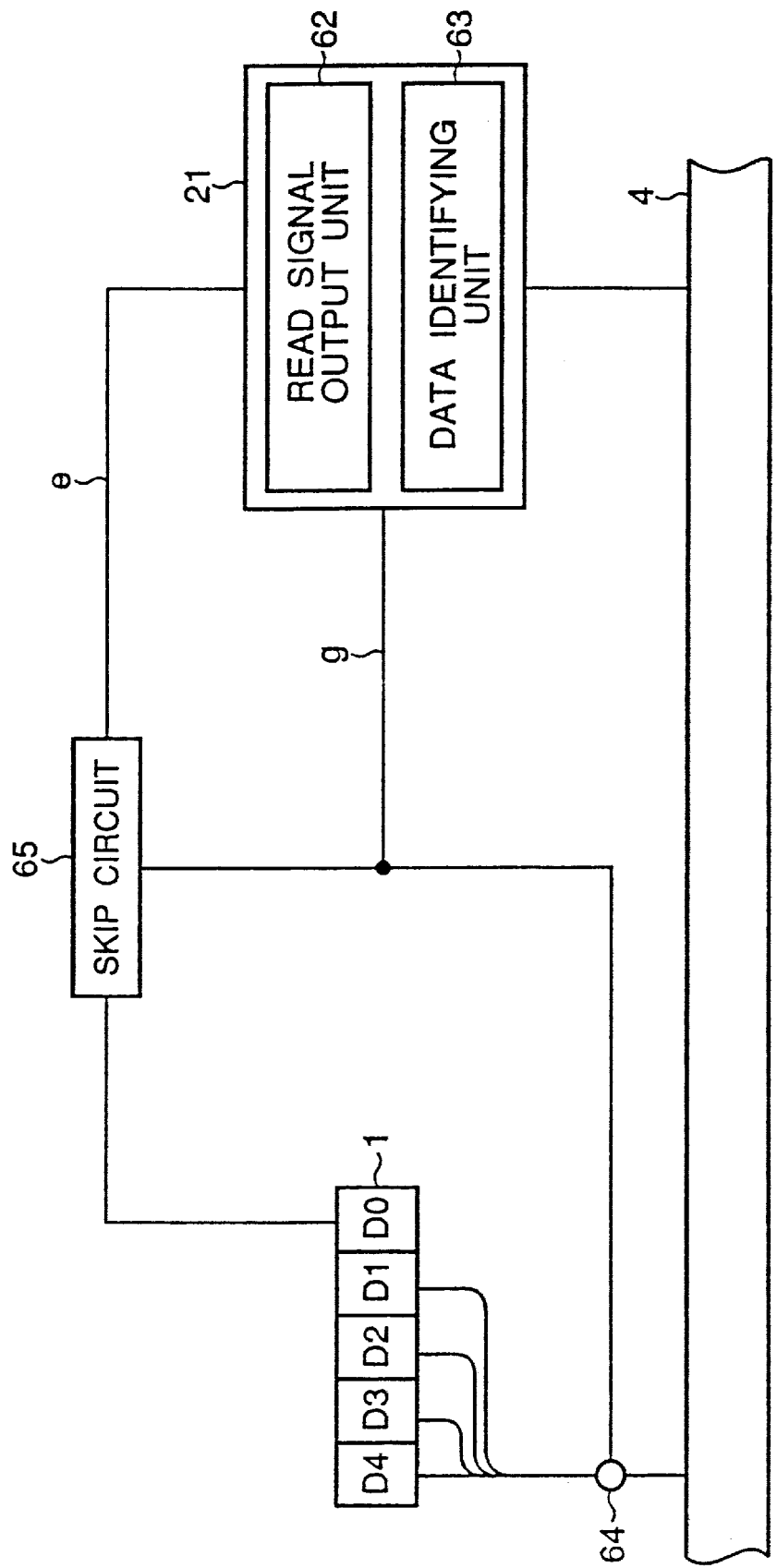
FIG. 16 is a block diagram showing the structure of a microcomputer according to a tenth embodiment of the present invention.

Referring next to FIG. 16, there is illustrated a block diagram showing the structure of a microcomputer according to a tenth embodiment of the present invention. In the figure, the same reference numerals as those shown in FIG. 1 denote the same or like components, and therefore the description about the components will be omitted hereinafter.

In FIG. 16, reference numeral 62 denotes a read signal output unit which can furnish the uppermost four bits reading instruction signal g, i.e., a read signal for allowing a gate circuit 64 to read the uppermost four data bits D1 to D4 of digital data stored in the AD register 1 in order to identify the value of the digital data obtained by the AD converter, and 63 denotes a data identifying unit which can identify the value of the digital data on the basis of the data bits D1 to D4 furnished by the gate circuit 64 and a skip signal e furnished by a skip circuit 65.

The gate circuit 64 is adapted to obtain the uppermost four data bits D1 to D4 from all the data bits D0 to D4 stored in the AD register 1 and furnish them by way of the data bus 4 in response to the uppermost four bits reading instruction signal g from the read signal output unit 62. Furthermore, the skip circuit 65 is adapted to obtain the remaining bit data D0, except the data bits D1 to D4 obtained by the gate circuit 64, from all the data bits D0 to D4 stored in the AD register 1 and furnish the skip signal e having a value corresponding to the value of the data bit D4 in response to the uppermost four bits reading instruction signal g from the read signal output unit 62.

In the above-mentioned first embodiment, the data identifying unit 23 is adapted to read the lowermost four data bits D0 to D3 from the AD register by way of the data bus 4 and identify the uppermost data bit D4 on the basis of the skip signal e furnished by the skip circuit 25. By contrast, the data identifying unit 63 according to the present embodiment is adapted to read the uppermost four data bits D1 to D4 from the AD register by way of the data bus 4 and identify the lowermost bit data D0 on the basis of the skip signal e furnished by the skip circuit 65.

When the AD converter completes an AD conversion process, a value stored in the successive comparison register 12 shown in FIG. 30 is transferred as an AD conversion result to the AD register 1, like the above-mentioned first embodiment. Furthermore, the AD conversion end signal ac showing that the AD conversion has been completed is furnished to the CPU 21.

In response to the AD conversion end signal ac, the read signal output unit 62 of the CPU 21 furnishes the uppermost four bits reading instruction signal g to both of the gate circuit 64 and the skip circuit 65. When the gate circuit 64 thus receives the uppermost four bits reading instruction signal g, it makes a transition from the nonconducting state to the conducting state, and therefore the highmost four data bits D1 to D4 stored in the AD register 1 are delivered onto the data bus 4. Accordingly, the data identifying unit 63 of the CPU 21 can read the data bit D1 to D4 from the data bus 4.

On the other hand, when the skip circuit 65 receives the uppermost four bits reading instruction signal g, it obtains the remaining data bit D0 other than the data bit D1 to D4 obtained by the gate circuit 64, from all the data bits D0 to D4 stored in the AD register 1 so as to identify the value of the data bit D0.

Then, the skip circuit 65 determines whether or not the value of the data bit D0 is "1". If the value of the date bit D0 is "1", the skip circuit 65 furnishes the skip signal e showing that the value of the bit data D0 is "1", e.g., at "High" state. On the contrary, if the value of the data bit D0 is "0", the skip circuit 65 furnishes the skip signal e showing that the value of the data bit D0 is "0", e.g., at "Low" state.

When the skip circuit 65 thus furnishes the skip signal e, the data identifying unit 63 of the CPU 21 analyzes an instruction in the software program to be executed next so as to determine whether or not it skips the instruction according to the value of the skip signal e delivered thereto.

That is, if the skip signal e is at "High" state, the CPU 21 determines that the lowermost data bit D0 of the digital data is "1" and then skips an instruction to be executed next. After that, the CPU executes another instruction included in the software program that performs a predetermined data process on the uppermost four data bits D1 to D4. On the contrary, if the skip signal e is at "Low" state, the CPU 21 determines that the lowermost data bit D0 of the digital data is "0" and then executes an instruction to be executed next. After that, the CPU executes another instruction included in the software program that performs a predetermined data processing on the uppermost four data bits D1 to D4.

Accordingly, the microprocessor according to the tenth embodiment is constructed such that when the read signal output unit 62 furnishes the uppermost four bits reading instruction signal g, the skip circuit 65 obtains the data bit D0 rather than the date bit D1 to D4 obtained by the gate register 64 from among all the data bits D0 to D4 of digital data stored in the AD register 1 and then furnishes the skip signal e having a value which corresponds to the value of the data bit D0 to the CPU. Therefore, this embodiment offers the advantage of being able to promptly identify the value of digital data, which is an AD conversion result, stored in the AD register 1, even though the number of bits of the digital data exceeds the number of bits that can be read at a time by the CPU 21.

Figure 17:
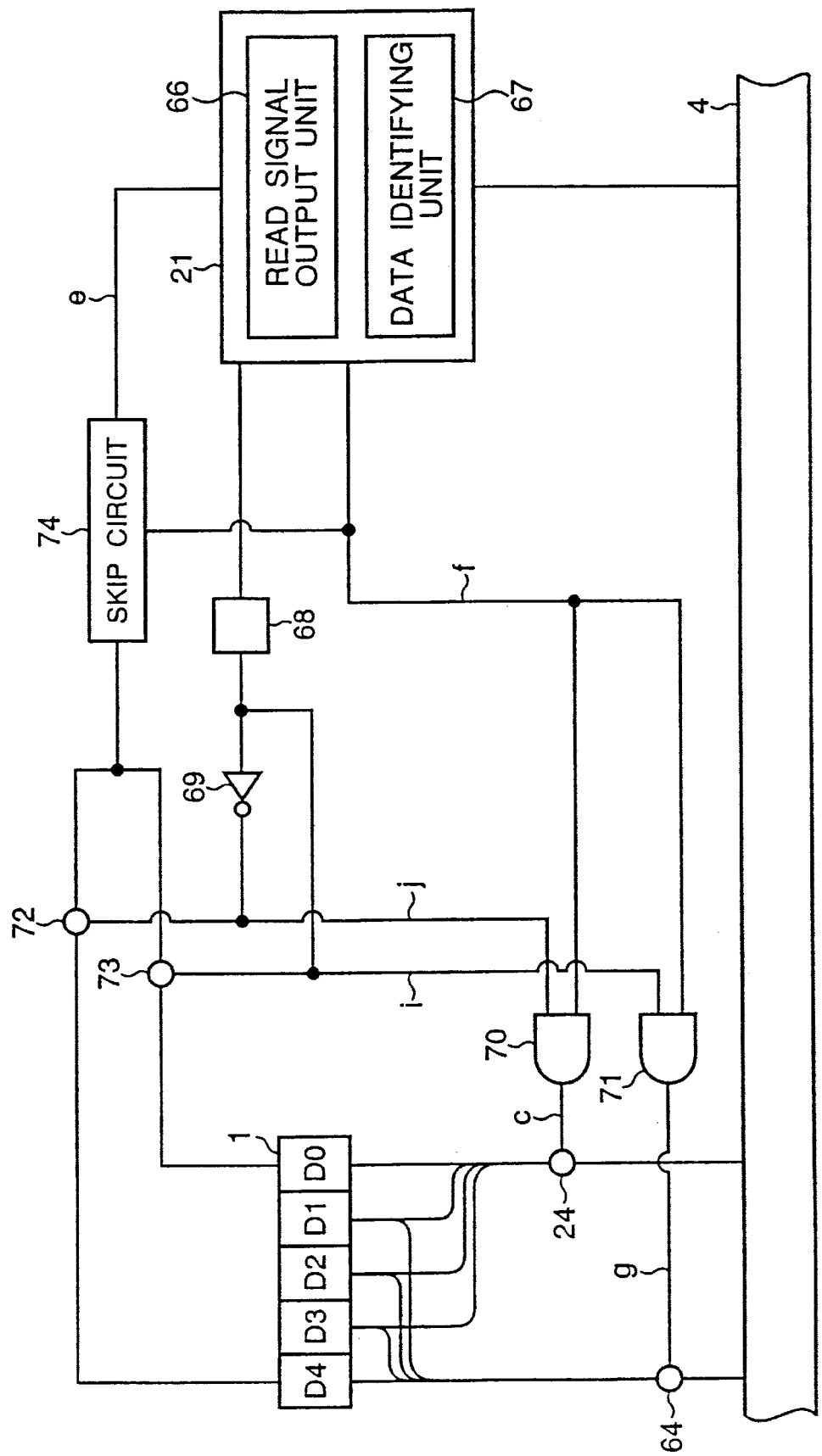
FIG. 17 is a block diagram showing the structure of a microcomputer according to an eleventh embodiment of the present invention.

Referring next to FIG. 17, there is illustrated a block diagram showing the structure of a microcomputer according to an eleventh embodiment of the present invention. In the figure, the same reference numerals as those shown in FIGS. 1 and 16 denote the same or like components, and therefore the description about the components will be omitted hereinafter.

In FIG. 17, reference numeral 66 denotes a read signal output unit which can furnish a read signal f in order to identify the value of digital data obtained by the AD converter, and 67 denotes a data identifying unit which can identify the value of the digital data on the basis of the data bits D1 to D4 furnished by the gate circuit 64 and a skip signal e furnished by a skip circuit 74.

Furthermore, reference numeral 68 denotes a switching register into which "0" can be written so that it furnishes a signal at "Low" state when the CPU 21 reads the lowermost four data bits D0 to D3 by way of the data bus 4, and into which "1" can be alternatively written so that it furnishes a signal at "High" state when the CPU 21 reads the lowermost four data bits D0 to D3 by way of the data bus 4, 69 denotes an inverter which inverts the level of the signal furnished by the switching register 68, 70 denotes an AND circuit which can furnish a lowermost four bits reading instruction signal c when the level of the signal j furnished by the inverter 69 is "High" and the read signal f from the read signal output unit 66 is delivered thereto, and 71 denotes an AND circuit which can furnish a uppermost four bits reading instruction signal g when the level of the signal i furnished by the switching register 68 is "High" and the read signal f from the read signal output unit 66 is delivered thereto.

Furthermore, reference numeral 72 denotes a gate circuit which changes to the conducting state when the signal j furnished by the inverter 69 makes a transition to the "High" state, 73 denotes a gate circuit which changes to the conducting state when the signal i furnished by the switching register 68 makes a transition to the "High" state, and 74 denotes a skip circuit which can obtain the uppermost data bit D4 or lowermost data bit D0 from all the data bits D0 to D4 of digital data stored in the AD register 1 by way of the gate circuit 72 or 73 and then furnish the skip signal e having a value corresponding to the value of the bit data D0 or D4 in response to the read signal f from the read signal output unit 62.

In either one of the above-mentioned first to tenth embodiments, the CPU is adapted to fixedly read either plural uppermost data bits or plural lowermost bit data by way of the data bus 4. By contrast, according to this eleventh embodiment, the CPU can be allowed to selectively read either the plural uppermost data bits or plural lowermost data bits by the software program or the like.

First, the description will be directed to the case where the CPU reads the lowermost four data bits D0 to D3 by way of the data bus 4. In this case, the read signal output unit 66 writes the value "0" into the switching register 68 first. As a result, the switching register 68 furnishes the signal i at "Low" state and hence the signal j furnished by the inverter 69 makes a transition to "High" state. Thus, the AND circuit 70 receives the signal j at "High" state at one input terminal thereof, and the AND circuit 71 receives the signal i at "Low" state at one input terminal thereof.

When the read signal output unit 66 furnishes the read signal f at "High" state under the above condition, both of the AND circuits 70 and 71 receive the read signal f at the other input terminals thereof. Then, since the AND condition is satisfied in the AND circuit 70, the AND circuit 70 furnishes the lowermost four bit reading instruction signal c to the gate circuit 24. On the other hand, since the AND condition is not satisfied in the AD circuit 71, the delivery of the uppermost four bit reading instruction signal g is restricted.

As a result, the gate circuit 64 remains in the nonconducting state while the gate circuit 24 changes to the conducting state, and therefore the lowermost four data bits D0 to D3 can be furnished to the CPU 21 by way of the data bus 4 so that the data identifying unit 67 can receive the lowermost four data bits D0 to D3.

Furthermore, since the signal i is at "Low" state and the signal j is at "High" state under the above condition, the gate circuit 72 changes to the conducting state and the gate circuit 73 remains in the nonconducting state. Accordingly, the skip circuit 74 can read the highmost bit data D4 by way of the gate circuit 72 and then furnish the skip signal e having a value which corresponds to the value of the bit data D4, like the above-mentioned first embodiment.

Thus, the data identifying unit 67 can identify the value of the digital data stored in the AD register 1 on the basis of the lowermost four data bits D0 to D3 and the skip signal e.

Next, the description will be directed to the case where the CPU reads the uppermost four data bits D1 to D4 by way of the data bus 4. In this case, the read signal output unit 66 writes the value "1" into the switching register 68 first. As a result, the switching register 68 furnishes the signal i at "High" state and hence the signal j furnished by the inverter 69 makes a transition to "Low" state. Thus, the AND circuit 70 receives the signal j at "Low" state at one of the input terminals thereof, and the AND circuit 71 receives the signal i at "High" state at one of the input terminals thereof.

When the read signal output unit 66 furnishes the read signal f at "High" state under the above condition, both of the AND circuits 70 and 71 receive the read signal f at the other input terminals thereof, respectively. Then, since the AND condition is satisfied in the AND circuit 71, the AND circuit 71 furnishes the uppermost four bit reading instruction signal g to the gate circuit 64. On the other hand, since the AND condition is not satisfied in the AD circuit 70, the delivery of the lowermost four bit reading instruction signal c is restricted.

As a result, the gate circuit 24 remains in the nonconducting state while the gate circuit 64 changes to the conducting state, and therefore the uppermost four data bits D1 to D4 can be furnished to the CPU 21 by way of the data bus 4 so that the data identifying unit 67 can receive the uppermost four data bits D1 to D4.

Furthermore, since the signal i is at "High" state and the signal j is at "Low" state under the above condition, the gate circuit 73 changes to the conducting state and the gate circuit 72 remains in the nonconducting state. Accordingly, the skip circuit 74 can read the lowermost bit data D0 by way of the gate circuit 73 and then furnish the skip signal e having a value which corresponds to the value of the data bit D0, like the above-mentioned tenth embodiment.

Thus, the data identifying unit 67 can identify the value of the digital data stored in the AD register 1 on the basis of the uppermost four data bits D1 to D4 and the skip signal e.

As can be apparent from the above description, this eleventh embodiment can offer the advantage of being able to selectively read either the uppermost four bit data or the lowermost four data bits by way of the data bus 4 by means of the software program or the like.

Figure 18:
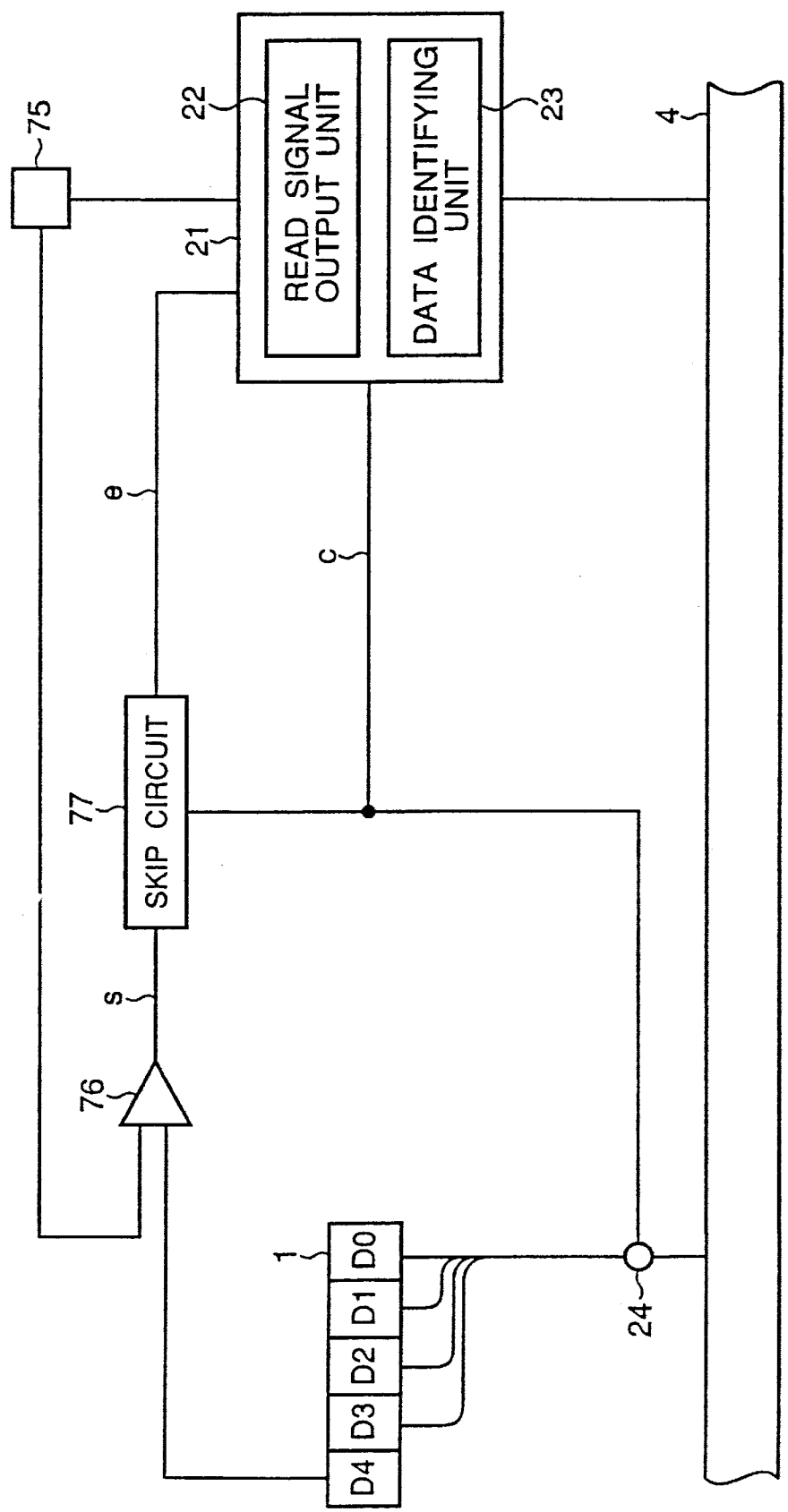
FIG. 18 is a block diagram showing the structure of a microcomputer according to a twelfth embodiment of the present invention.

Referring next to FIG. 18, there is illustrated a block diagram showing the structure of a microcomputer according to a twelfth embodiment of the present invention. In the figure, the same reference numerals as those shown in FIG. 1 denote the same or like components, and therefore the description about the components will be omitted hereinafter.

In FIG. 18, reference numeral 75 denotes a comparison register into which a value can be written in order for a comparison circuit to compare the value with the uppermost data bit D4, 76 denotes the comparison circuit which compares the value of the data bit D4 with the value stored in the comparison register 75, and 77 denotes a skip circuit which furnishes the skip signal e having a value which corresponds to the comparison result s by the comparison circuit 76.

In the above-mentioned first embodiment, the skip circuit 25 is adapted to furnish the skip signal e having a value which corresponds to the value of the data bit D4. By contrast, the skip circuit 77 according to the present embodiment is adapted to furnish the skip signal e having a value which corresponds to the result of a comparison of the data bit D4 to the setting stored in the comparison register 75 by the comparison circuit 76. Accordingly, this embodiment can offer the same advantage as that provided by the above-mentioned first embodiment.

For example, when the read signal output unit 22 of the CPU 21 writes the value "0" into the comparison register 75, the comparison circuit 76 furnishes the comparison result signal s at "High" state if the value of the data bit D4 is "0" and alternatively furnishes the comparison result signal s at "Low" state if the value of the data bit D4 is "1". As a result, the skip circuit 77 furnishes the skip signal e showing that the value of the data bit D4 is "0", e.g., the signal e at "High" state if the signal s is at "High" state. On the other hand, if the signal s is at "Low" state, the skip circuit 77 furnishes the skip signal e showing that the value of the data bit D4 is "1", e.g., the signal e at "Low" state.

On the contrary, when the read signal output unit 22 of the CPU 21 writes the value "1" into the comparison register 75, the comparison circuit 76 furnishes the signal s at "High" state if the value of the bit data D4 is "1" and alternatively furnishes the signal s at "Low" state if the value of the data bit D4 is "0". As a result, the skip circuit 77 furnishes the skip signal e showing that the value of the data D4 is "1", e.g., the signal e at "High" state if the signal s is at "High" state. On the other hand, if the signal s is at "Low" state, the skip circuit 77 furnishes the skip signal e showing that the value of the data bit D4 is "0", e.g., the signal e at "Low" state.

As can be apparent from the above description, this twelfth embodiment can offer the advantage of being able to selectively switch between the skip process of skipping an instruction to be executed next when the uppermost data bit D4 is "0" and the skip process of skipping an instruction to be executed next when the uppermost data bit D4 is "1", by means of the software program.

Figure 19:
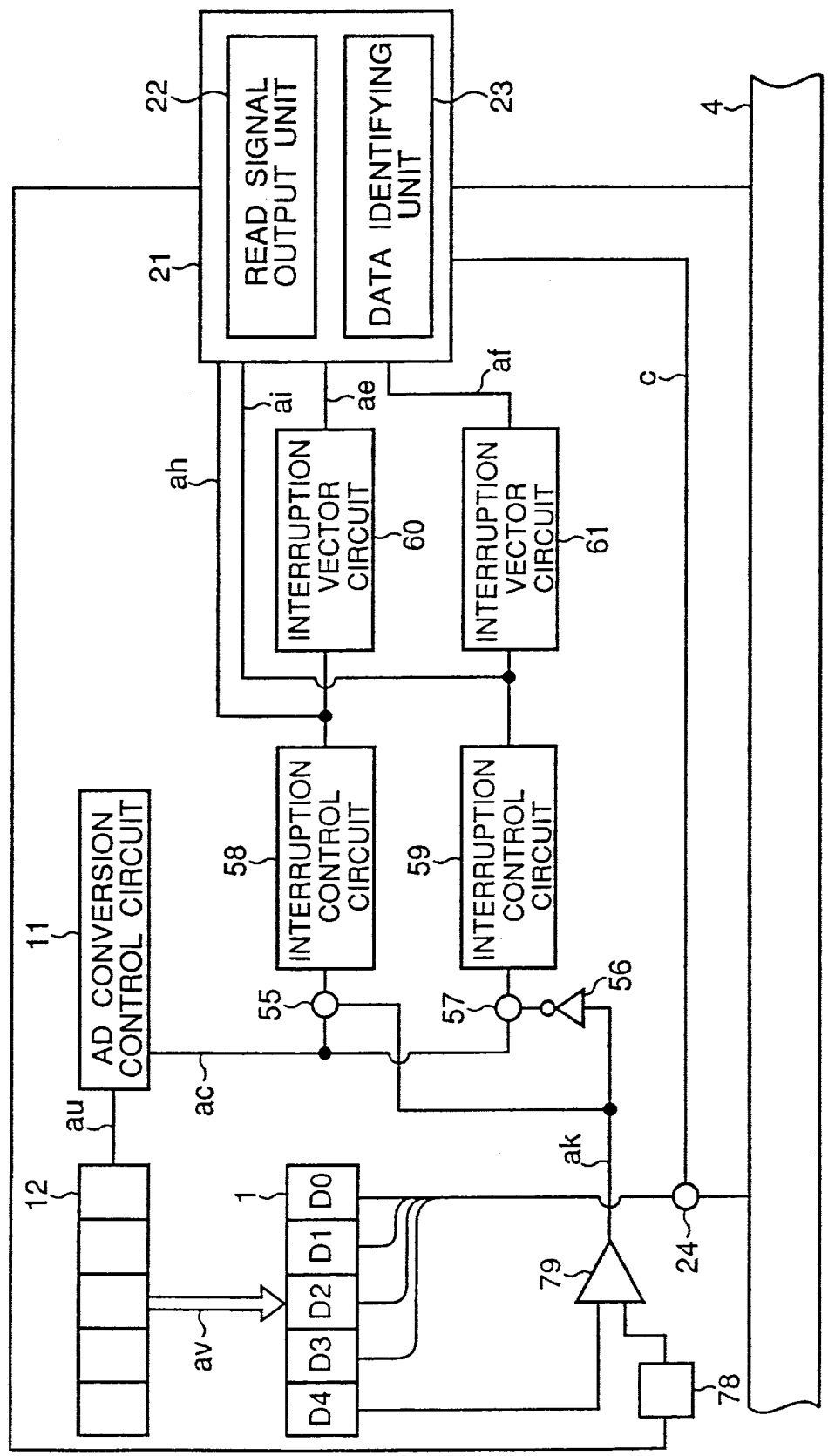
FIG. 19 is a block diagram showing the structure of a microcomputer according to a thirteenth embodiment of the present invention.

Referring next to FIG. 19, there is illustrated a block diagram showing the structure of a microcomputer according to a thirteenth embodiment of the present invention. In the figure, the same reference numerals as those shown in FIG. 15 denote the same or like components, and therefore the description about the components will be omitted hereinafter.

In FIG. 19, reference numeral 78 denotes a comparison register into which a value can be written and used for comparison by a comparison circuit, and 79 denotes the comparison circuit which compares the value of the bit data D4 with the value stored in the comparison register 78.

In the above-mentioned ninth embodiment, either one of the interruption vector circuits 60 and 61 is allowed to furnish corresponding one of the interruption addresses ae and af according to the value of the data bit D4. By contrast, according to the present embodiment, after the comparison circuit 79 has compared the value of the data bit D4 with the setting stored in the comparison register 78, either one of the interruption vector circuits 60 and 61 is selectively allowed to furnish corresponding one of the interruption addresses ae and af according to the comparison result. Accordingly, this embodiment can offer the same advantage as that provided by the above-mentioned ninth embodiment.

For example, when the read signal output unit 22 of the CPU 21 writes the value "1" into the comparison register 78, the comparison circuit 79 furnishes a signal ak at "High" state if the value of the data bit D4 is "1" and furnishes the signal ak at "Low" state if the value of the data bit D4 is "0". As a result, if the signal ak is at "High" state, the gate circuit 55 changes to the conducting state and the gate circuit 57 remains in the nonconducting state with the result that the interruption control circuit 58 furnishes the interruption signal ah to the interruption vector circuit 60 and only the interruption vector circuit 60 can furnish the interruption address ae. On the other hand, if the signal ak is at "Low" state, the gate circuit 57 changes to the conducting state and the gate circuit 55 remains in the nonconducting state with the result that the interruption control circuit 59 furnishes the interruption signal ai to the interruption vector circuit 61 and only the interruption vector circuit 61 can furnish the interruption address af. Since the operation of the CPU followed by the above operation of the interruption vector circuit 60 or 61 is the same as that of the CPU of the microcomputer of the eighth embodiment, the description about the CPU's operation will be omitted hereinafter.

On the contrary, when the read signal output unit 22 of the CPU 21 writes the value "0" into the comparison register 78, the comparison circuit 79 furnishes the signal ak at "High" state if the value of the data bit D4 is "0" and furnishes the signal ak at "Low" state if the value of the data bit D4 is "1". As a result, if the signal ak is at "High" state, the gate circuit 55 changes to the conducting state and the gate circuit 57 remains in the nonconducting state with the result that the interruption control circuit 58 furnishes the interruption signal ah to the interruption vector circuit 60 and the interruption vector circuit 60 furnishes the interruption address ae. On the other hand, if the signal ak is at "Low" state, the gate circuit 57 changes to the conducting state and the gate circuit 55 remains in the nonconducting state with the result that the interruption control circuit 59 furnishes the interruption signal ai to the interruption vector circuit 61 and the interruption vector circuit 61 furnishes the interruption address af. Since the operation of the CPU followed by the above operation of the interruption vector circuit 60 or 61 is the same as that of the microcomputer of the eighth embodiment, the description about the CPU's operation will be omitted hereinafter.

As can be apparent from the above description, this thirteenth embodiment can offer the advantage of being able to identify the value of the uppermost one data bit of digital data without having to read the data by way of the data bus 4 and further change a data process for the lowermost four data bits of the digital data by optionally changing the interruption address according the value of the uppermost data bit.

Figure 20:
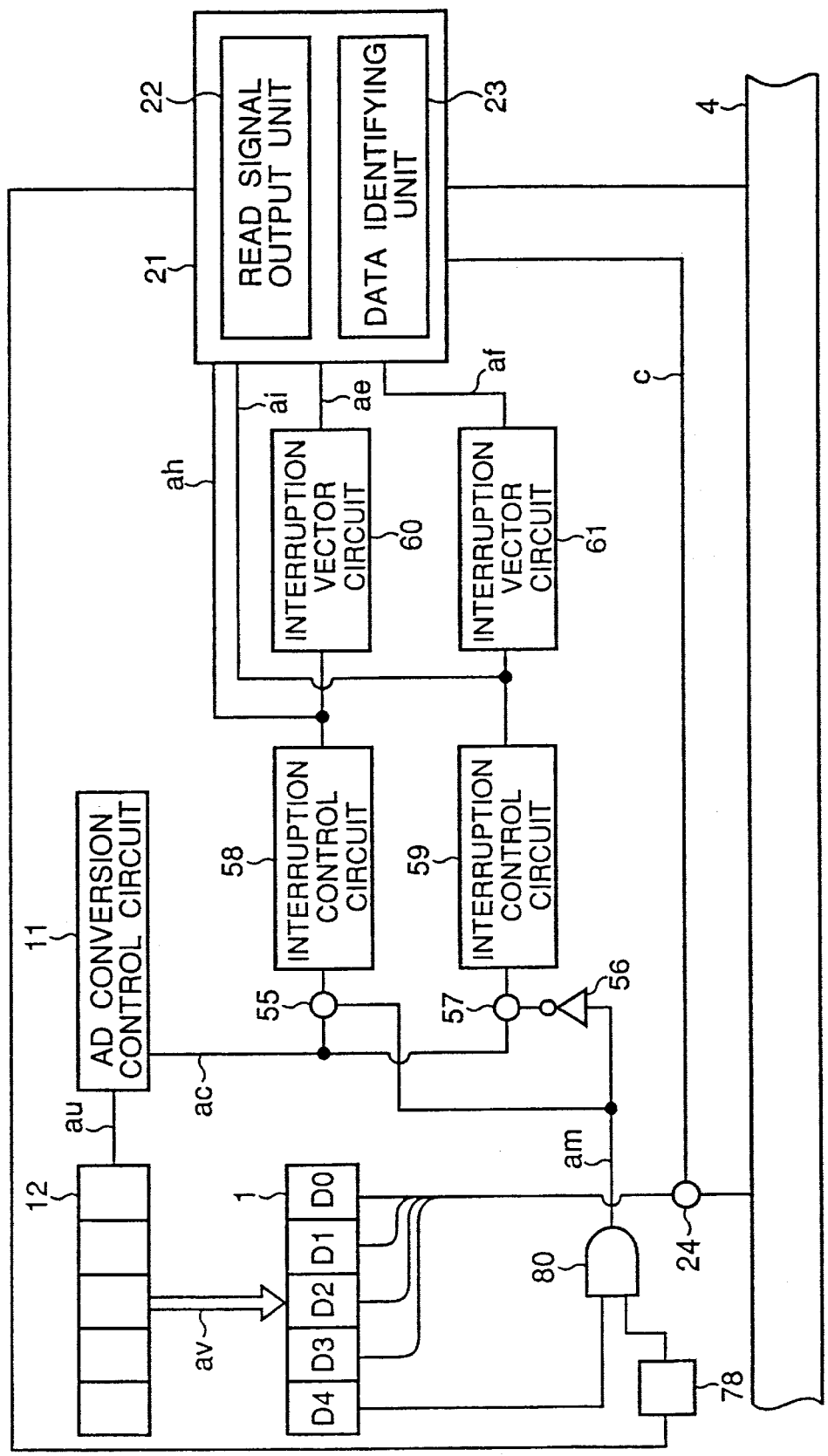
FIG. 20 is a block diagram showing the structure of a microcomputer according to a fourteenth embodiment of the present invention.

Referring next to FIG. 20, there is illustrated a block diagram showing the structure of a microcomputer according to a fourteenth embodiment of the present invention. In the figure, the same reference numerals as those shown in FIG. 19 denote the same or like components, and therefore the description about the components will be omitted hereinafter.

In FIG. 20, reference numeral 80 denotes an AND circuit which can furnish a signal am at "High" state when the value of the bit data D4 is "1" and the value stored in the comparison register 78 is "1".

In the above-mentioned ninth embodiment, the microcomputer is constructed such that either one of the interruption vector circuits 60 and 61 can furnish the address ae or af according to the value of the data bit D4. By contrast, the microcomputer according to the present embodiment is constructed such that the AND circuit 80 furnishes the signal am having a value which differs according to whether or not the value of the data bit D4 is coincident with the setting stored in the comparison register 78, and either one of the interruption vector circuits 60 and 61 furnishes the interruption address ae or af according to the value of the signal am. Thus, this embodiment can offer the same advantage as that provided by the above-mentioned ninth embodiment.

When the CPU 21 starts to execute the software program or executes an instruction for taking the uppermost data bit D4 into consideration during the program's execution, the read signal output unit 22 of the CPU 21 writes the value "1" into the comparison register 78. In this case, the AND circuit 80 furnishes the signal am at "High" state if the value of the data bit D4 is "1" and alternatively furnishes the signal am at "Low" state if the value of the data bit D4 is "0". As a result, if the signal am is at "High" state, the gate circuit 55 changes to the conducting state and the gate circuit 57 remains in the nonconducting state with the result that the interruption control circuit 58 furnishes the interruption signal ah to the interruption vector circuit 60 and the interruption vector circuit 60 can furnish the interruption address ae. On the other hand, if the signal am is at "Low" state, the gate circuit 57 changes to the conducting state and the gate circuit 55 remains in the nonconducting state with the result that the interruption control circuit 59 furnishes the interruption signal ai to the interruption vector circuit 61 and the interruption vector circuit 61 can furnish the interruption address af. Since the operation of the CPU followed by the above operation of the interruption vector circuit 60 or 61 is the same as that of the microcomputer of the eighth embodiment, the description about the CPU's operation will be omitted hereinafter.

When the CPU 21 executes an instruction in the software program for forcing itself to neglect the uppermost data bit D4, i.e., performing following statements on the assumption that the uppermost data bit D4 of the digital data stored in the AD register 1 would be "0" during the program's execution, the read signal output unit 22 of the CPU 21 writes the value "0" into the comparison register 78. In this case, the AND circuit 80 furnishes the signal am at "Low" state at all times because the AND conditions are not established regardless of whether the value of the data bit D4 is "0" or "1". As a result, since the level of the signal am is "Low" at all times, the gate circuit 57 changes to and remains in the conducting state at all times while the gate circuit 55 remains in the nonconducting state at all times, with the result that the interruption control circuit 59 furnishes the interruption signal ai to the interruption vector circuit 61 and the interruption vector circuit 61 can furnish the interruption address af. Since the operation of the CPU followed by the above operation of the interruption vector circuit 60 or 61 is the same as that of the microcomputer of the eighth embodiment, the description about the CPU's operation will be omitted hereinafter.

As can be apparent from the above description, this fourteenth embodiment can offer the advantage of being able to identify the value of the uppermost one data bit of digital data without having to read the data by way of the data bus 4 and further change a data process for the lowermost four data bits of the digital data by setting the value of the comparison register 78 to "1" so as to optionally change the interruption address according the value of the uppermost data bit.

Furthermore, since the interruption vector circuit 61 can furnish the interruption address af at all times when the value of the comparison register 78 is set to "0", the embodiment can offer the advantage of being able to simplify the following data processing by neglecting the uppermost one data bit D4.

Figure 21:
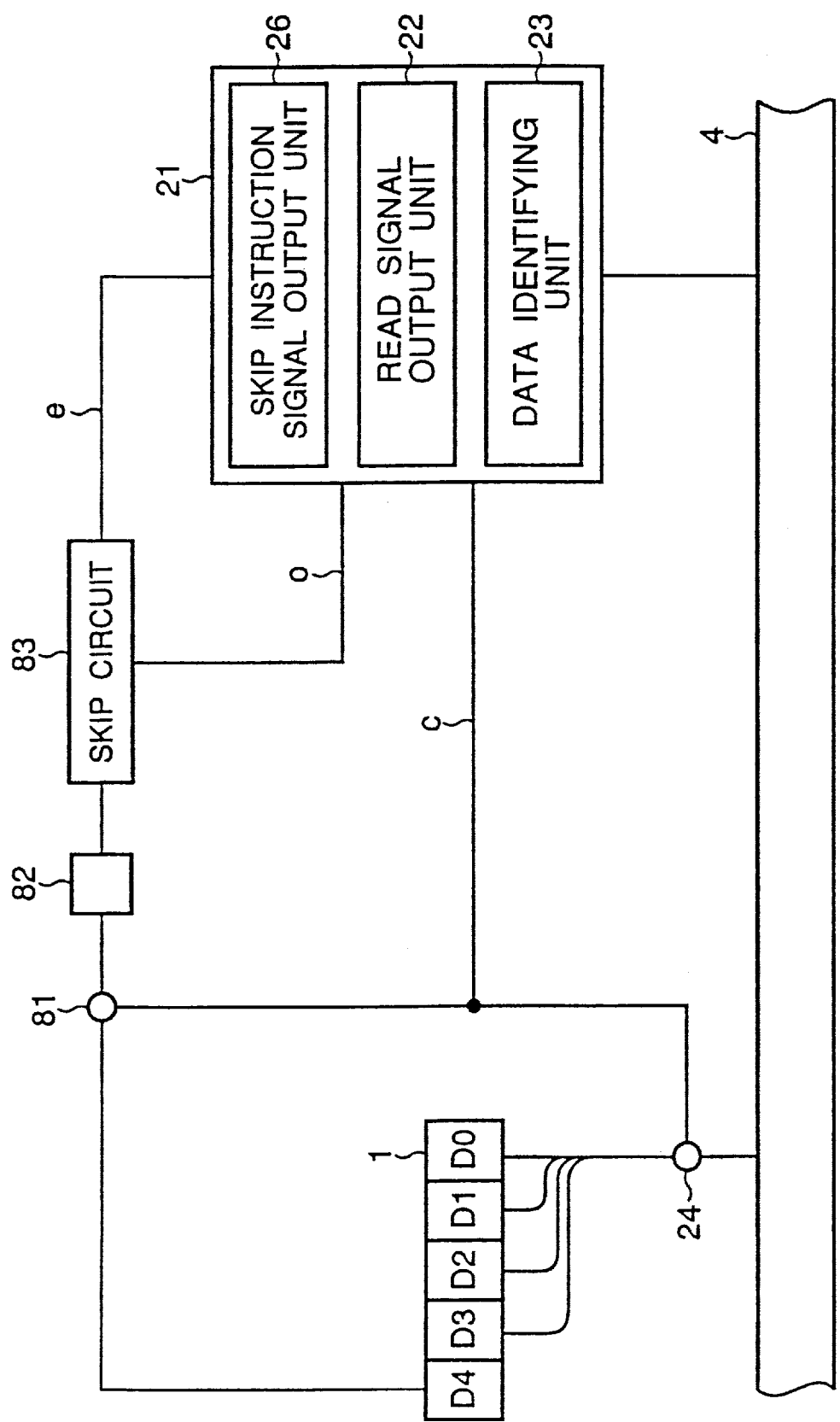
FIG. 21 is a block diagram showing the structure of a microcomputer according to a fifteenth embodiment of the present invention.

Referring next to FIG. 21, there is illustrated a block diagram showing the structure of a microcomputer according to a fifteenth embodiment of the present invention. In the figure, the same reference numerals as those shown in FIG. 3 denote the same or like components, and therefore the description about the components will be omitted hereinafter.

In FIG. 21, reference numeral 81 denotes a gate circuit which changes to the conducting state when the read signal output unit 22 furnishes the lowermost four bit reading instruction signal c, 82 denotes a saving register which stores the value of the uppermost data bit D4 when the gate circuit 81 changes to the conducting state, and 83 denotes a skip circuit which can furnish the skip signal e having a value which differs according to the value of the bit data D4 stored in the saving register 82 when the skip instruction signal output unit 26 furnishes the skip instruction signal o.

In the above-mentioned second embodiment, the microcomputer is constructed such that the skip circuit 27 obtains the data bit D4 from the AD register 1 and then furnishes the skip signal e having a value which differs according to the value of the data bit D4 in response to the skip instruction signal o from the skip instruction signal output unit 26. By contrast, the skip circuit 83 according to the present embodiment is adapted to furnish the skip signal having a value which differs according to the value of the data bit D4 stored in the saving register 82 in response to the skip instruction signal o from the skip instruction signal output unit 26.

When the read signal output unit 22 delivers the lowermost four bit reading instruction signal c, the gate circuit 81 changes from the nonconducting state to the conducting state and therefore the value of the data bit D4 is stored in the saving register 82. Then, when the value stored in the saving register 82 is "1", the skip circuit 83 furnishes the skip signal e showing that the value of the bit data D4 is "1", e.g., the skip signal e at "High" state, and when the value stored in the saving register 82 is "0", the skip circuit 83 furnishes the skip signal e showing that the value of the data bit D4 is "0", e.g., the skip signal e at "Low" state.

As can be apparent from the above description, since the skip circuit of this embodiment can furnish the skip signal e having a value which differs according to the value of the data bit D4, this fifteenth embodiment can offer the same advantage as that provided by the above-mentioned second embodiment. Furthermore, the embodiment can offer the advantage of being able to properly identify the value of digital data without the loss of the digital data even though the lowermost four reading instruction signal c is furnished and then the next AD conversion is complete before the skip instruction signal o is delivered to the skip circuit with the result that the value of the AD register 1 is replaced by the next AD conversion result.

Figure 22:
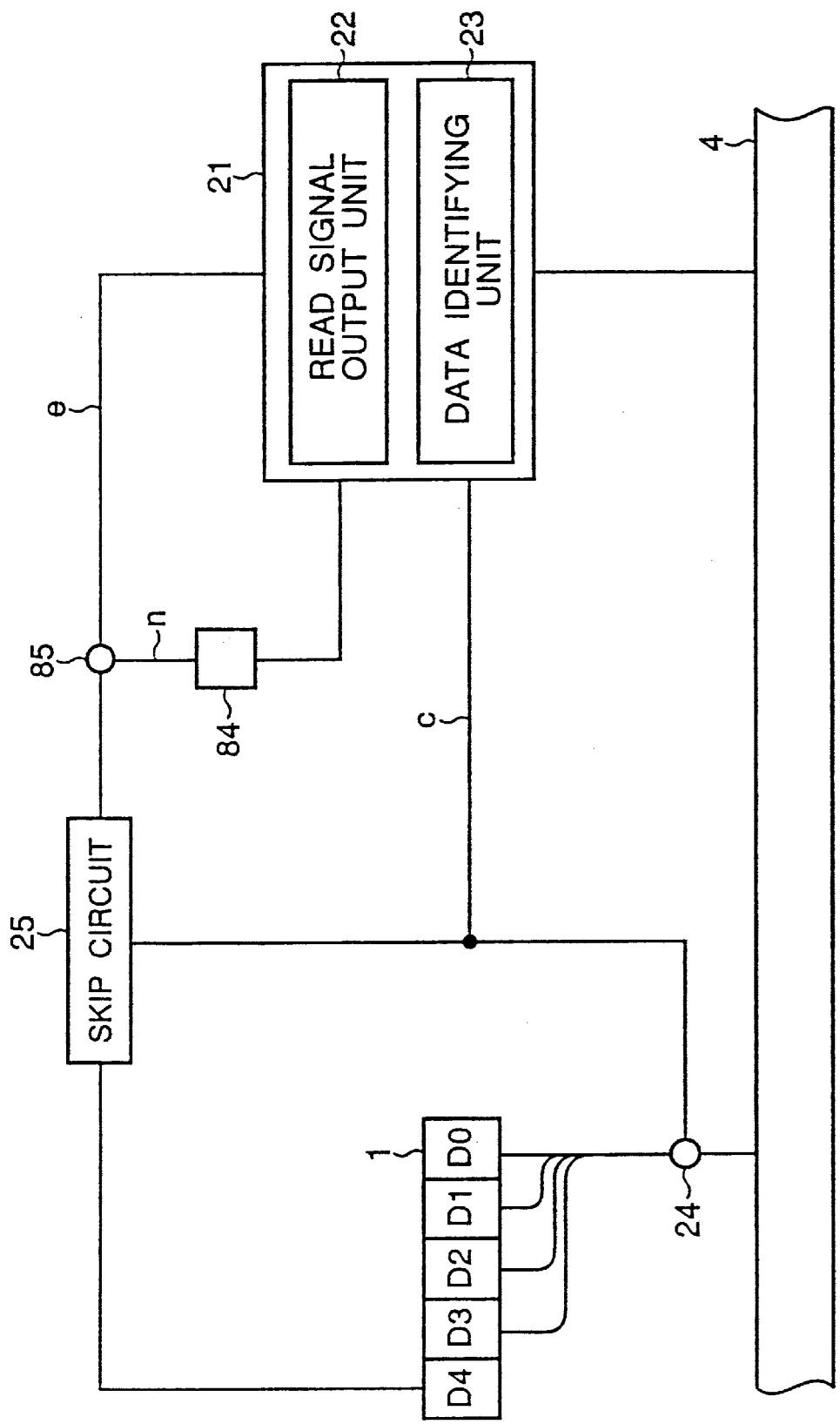
FIG. 22 is a block diagram showing the structure of a microcomputer according to a sixteenth embodiment of the present invention.

Referring next to FIG. 22, there is illustrated a block diagram showing the structure of a microcomputer according to a sixteenth embodiment of the present invention. In the figure, the same reference numerals as those shown in FIG. 1 denote the same or like components, and therefore the description about the components will be omitted hereinafter.

In FIG. 22, reference numeral 84 denotes a skip enable register which can furnish a signal n at "High" state when the read signal output unit 22 sets the value of the skip enable register to "1" and alternatively furnish the signal n at "Low" state when the read signal output unit 22 sets the value of the skip enable register to "0", and 85 denotes a gate circuit which changes to the conducting state when the skip enable register 84 furnishes the signal n at "High" state.

In the above-mentioned first embodiment, the microcomputer is constructed such that the skip circuit 25 furnishes the skip signal e without condition in response to the lowermost four bit reading instruction signal c from the read signal output unit 22. By contrast, according to the present embodiment, only when the setting value of the skip enable register 84 is "1", the gate circuit 85 changes to the conducting state so that the skip signal e from the skip circuit 25 can be delivered to the CPU 21.

The microcomputer having such the structure according to this embodiment can offer the same advantage as that provided by the above-mentioned first embodiment. Furthermore, the embodiment can offer the advantage of being able to simplify the following data processing by neglecting the uppermost one data bit since the delivery of the skip signal e can be restricted by setting the skip enable register 84 to "0".

Figure 23:
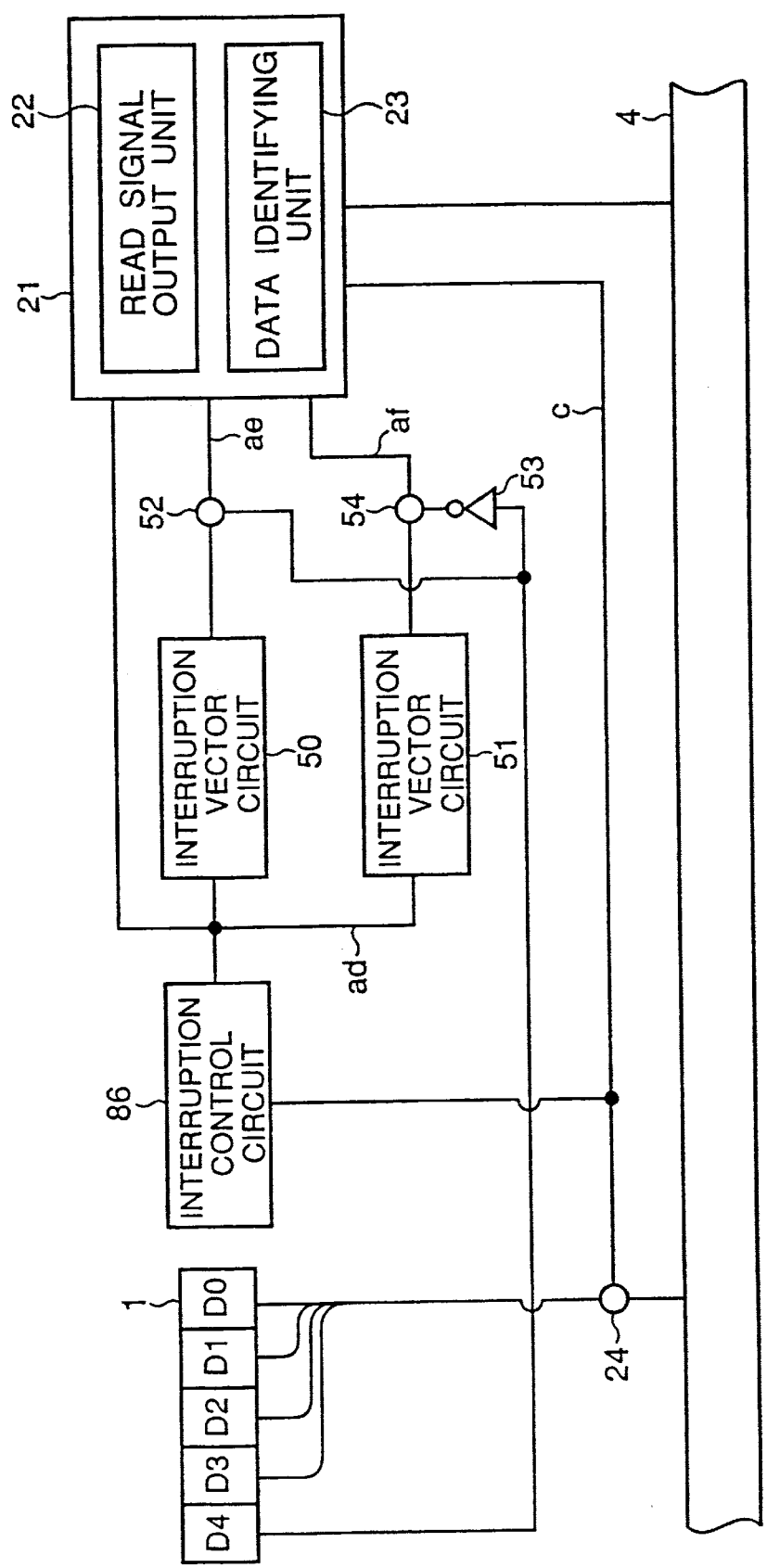
FIG. 23 is a block diagram showing the structure of a microcomputer according to a seventeenth embodiment of the present invention.

Referring next to FIG. 23, there is illustrated a block diagram showing the structure of a microcomputer according to a seventeenth embodiment of the present invention. In the figure, the same reference numerals as those shown in FIG. 14 denote the same or like components, and therefore the description about the components will be omitted hereinafter.

In FIG. 23, reference numeral 86 denotes an interruption control circuit which can furnish an interruption signal ad when the read signal output unit 22 furnishes the lowermost four bit reading instruction signal c.

In the above-mentioned eighth embodiment, the microcomputer is constructed such that the interruption control circuit 49 furnishes the interruption signal ad when the AD conversion control circuit 11 delivers the AD conversion end signal ac. By contrast, the interruption control circuit 86 according to the present embodiment is adapted to furnish the interruption signal ad when the read signal output unit 22 delivers the lowermost four bit reading instruction signal c. Thus, the present embodiment can offer the same advantage as that provided by the above-mentioned eighth embodiment.

Figure 24:
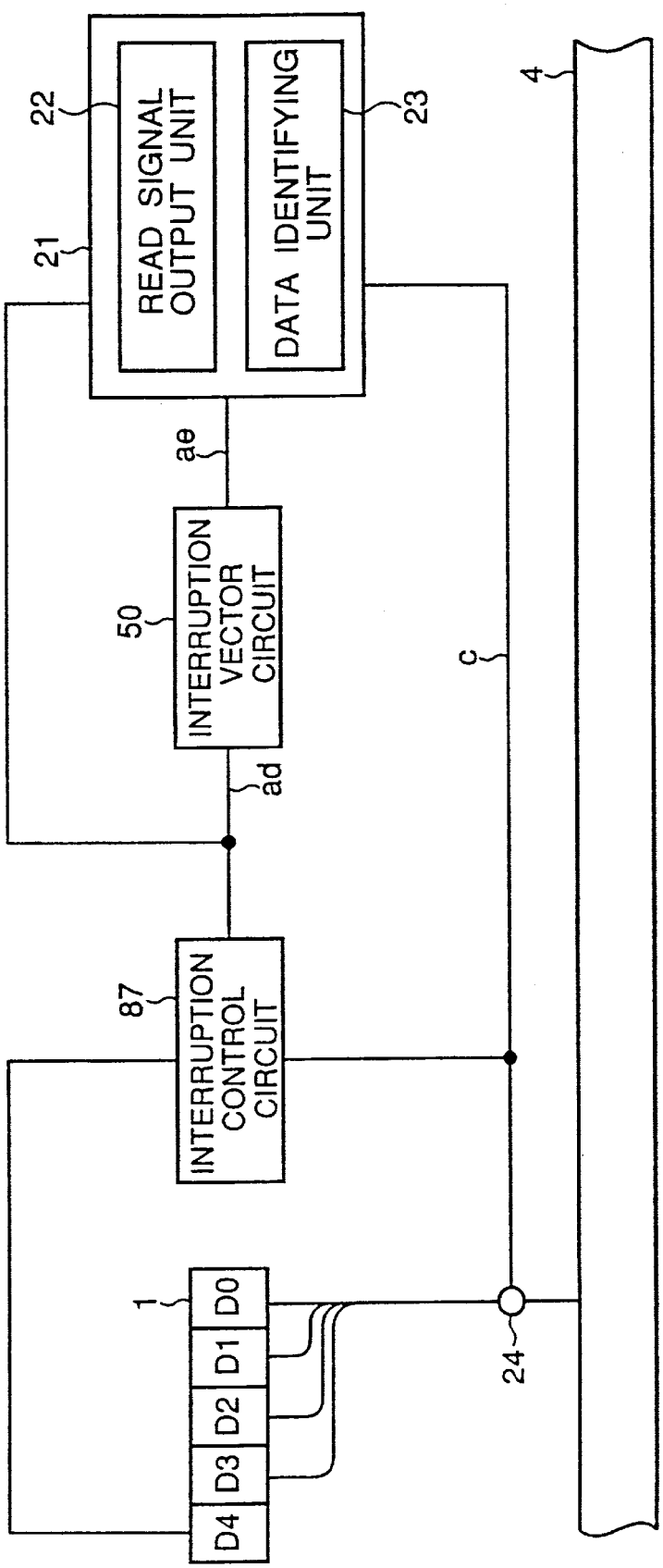
FIG. 24 is a block diagram showing the structure of a microcomputer according to an eighteenth embodiment of the present invention.

Referring next to FIG. 24, there is illustrated a block diagram showing the structure of a microcomputer according to an eighteenth embodiment of the present invention. In the figure, the same reference numerals as those shown in FIG. 23 denote the same or like components, and therefore the description about the components will be omitted hereinafter.

In FIG. 24, reference numeral 87 denotes an interruption control circuit, responsive to the lowermost four bit reading instruction signal c from the read signal output unit 22, for furnishing an interruption signal ad only when the value of the uppermost data bit D4 is "1".

In the above-mentioned seventeenth embodiment, the microcomputer is so constructed as to furnish either the interruption address ae or af according to the value of the bit data D4. By contrast, the interruption control circuit 87 according to the present embodiment is adapted to furnish the interruption signal ad only when the value of the uppermost data bit D4 is "1" so as to allow the interruption vector circuit 50 to furnish the interruption address ae, and restrict the delivery of the interruption signal ad otherwise, i.e., when the value of the uppermost data bit D4 is "0".

Accordingly, in response to the interruption signal ad, the data identifying unit 23 determines that the value of the uppermost data bit D4 is "1" and then executes the interrupt program specified by the interruption address ae, which can perform data processing on the lowermost four data bits of the digital data. On the other hand, when the interruption signal ad is not delivered to the CPU, the data identifying unit 23 determines that the value of the uppermost data bit D4 is "0" and then executes an instruction to be executed next in the software program, which can perform data processing on the lowermost four data bits of the digital data, without skipping the instruction.

Figure 25:
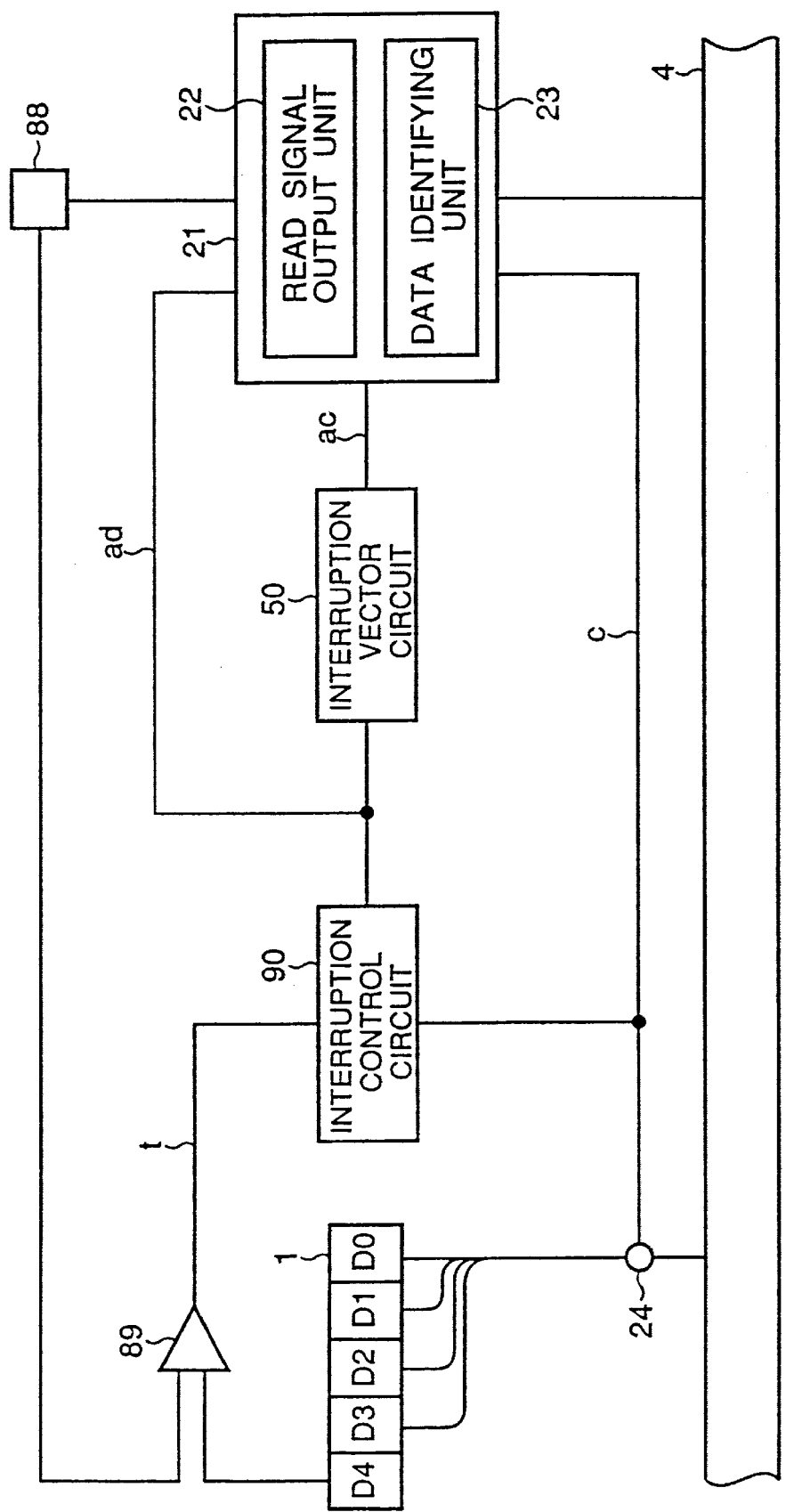
FIG. 25 is a block diagram showing the structure of a microcomputer according to a nineteenth embodiment of the present invention.

Referring next to FIG. 25, there is illustrated a block diagram showing the structure of a microcomputer according to a nineteenth embodiment of the present invention. In the figure, the same reference numerals as those shown in FIG. 24 denote the same or like components, and therefore the description about the components will be omitted hereinafter.

In FIG. 25, reference numeral 88 denotes a comparison register into which a value to be used for comparison by a comparison circuit 89 which can compare the value of the uppermost data bit D4 with the value stored in the comparison register 88, and 90 denotes an interruption control circuit which can furnish an interruption signal ad in response to a signal t at "High" state from the comparison circuit 89.

In the above-mentioned eighteenth embodiment, the interruption control circuit 87 is adapted to furnish the interruption signal ad when the value of the data bit D4 is "1". By contrast, the interruption control circuit 87 according to the present embodiment is adapted to furnish the interruption signal ad only when the comparison circuit 89 furnishes the signal t showing that the value of the uppermost data bit D4 is coincident with the setting stored in the comparison register 88. Thus, the present embodiment can offer the same advantage as that provided by the above-mentioned eighteenth embodiment.

For example, when the read signal output unit 22 of the CPU 21 writes the value "0" into the comparison register 88, the comparison circuit 89 furnishes the signal t at "High" state if the value of the uppermost data bit D4 is "0", and alternatively furnishes the signal t at "Low" state if the value of the uppermost data bit D4 is "1". Accordingly, only when the value of the uppermost data bit D4 is "0", the interruption control circuit 90 furnishes the interruption signal ad.

On the other hand, when the read signal output unit 22 of the CPU 21 writes the value "1" into the comparison register 88, the comparison circuit 89 furnishes the signal t at "High" state if the value of the uppermost data bit D4 is "1", and alternatively furnishes the signal t at "Low" state if the value of the uppermost data bit D4 is "0". Accordingly, only when the value of the uppermost date bit D4 is "1", the interruption control circuit 90 furnishes the interruption signal ad.

As can be apparent from the above description, this nineteenth embodiment can offer the advantage of being able to easily identify the value of the uppermost one data bit since the generation of the interruption signal ad can be controlled according to the value of the uppermost one data bit, and further change a data processing for the lowermost four data bits of the digital data by optionally changing the setting stored in the comparison register 88.

Figure 26:
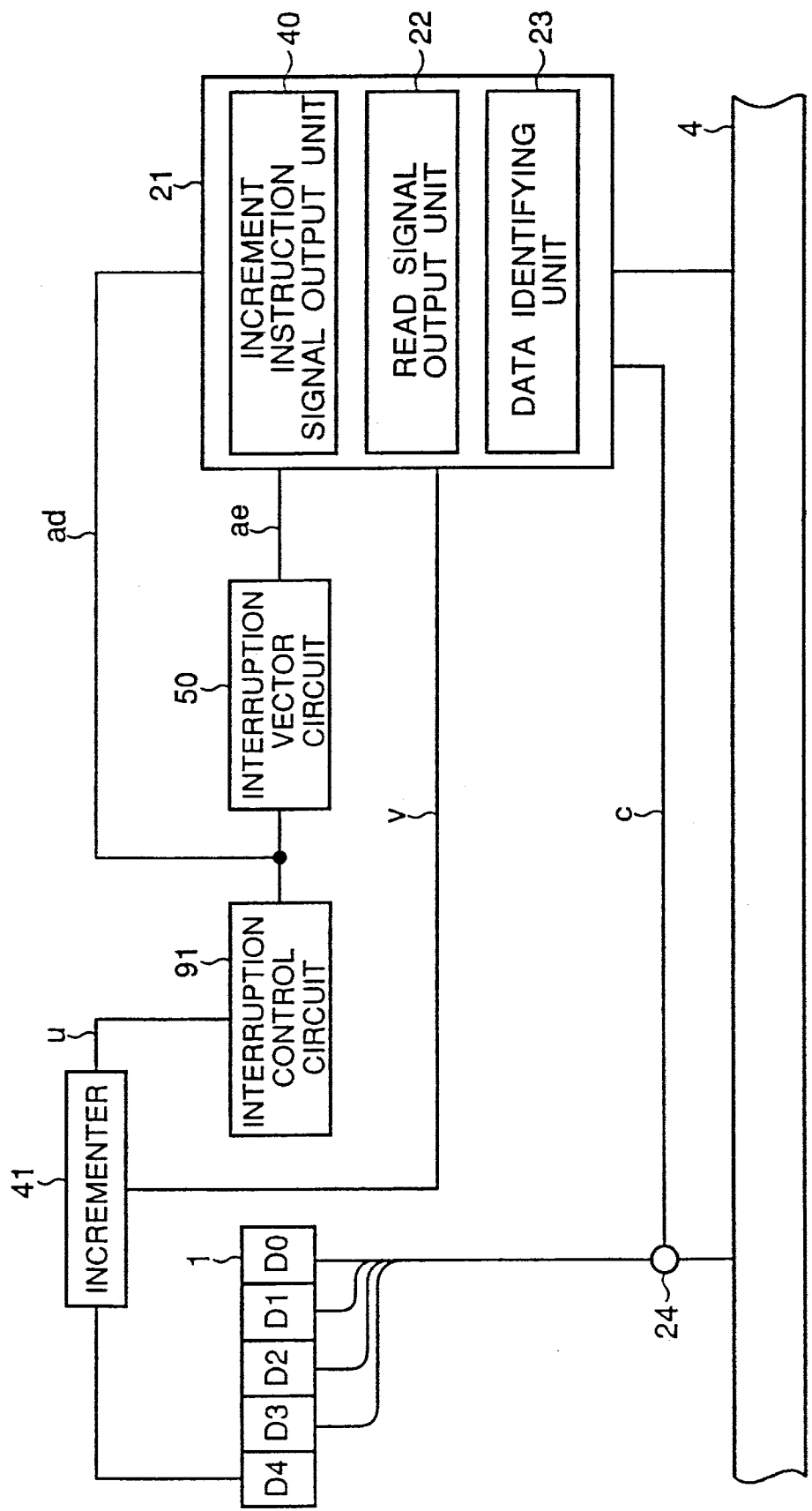
FIG. 26 is a block diagram showing the structure of a microcomputer according to a twentieth embodiment of the present invention.

Referring next to FIG. 26, there is illustrated a block diagram showing the structure of a microcomputer according to a twentieth embodiment of the present invention. In the figure, the same reference numerals as those shown in FIG. 25 denote the same or like components, and therefore the description about the components will be omitted hereinafter.

In FIG. 26, reference numeral 91 denotes an interruption control circuit which can furnish an interruption signal ad when the incrementer 41 delivers a carry signal u showing that a carry has occurred.

In the above-mentioned nineteenth embodiment, the interruption control circuit 90 is adapted to furnish the interruption signal ad when the signal t furnished by the comparison circuit 89 is at "High" state. By contrast, the interruption control circuit 91 according to the present embodiment is adapted to furnish the interruption signal ad when the incrementer 41 furnishes the carry signal u showing the occurrence of a carry. Thus, the present embodiment can offer the same advantage as that provided by the above-mentioned nineteenth embodiment.

Figure 27:
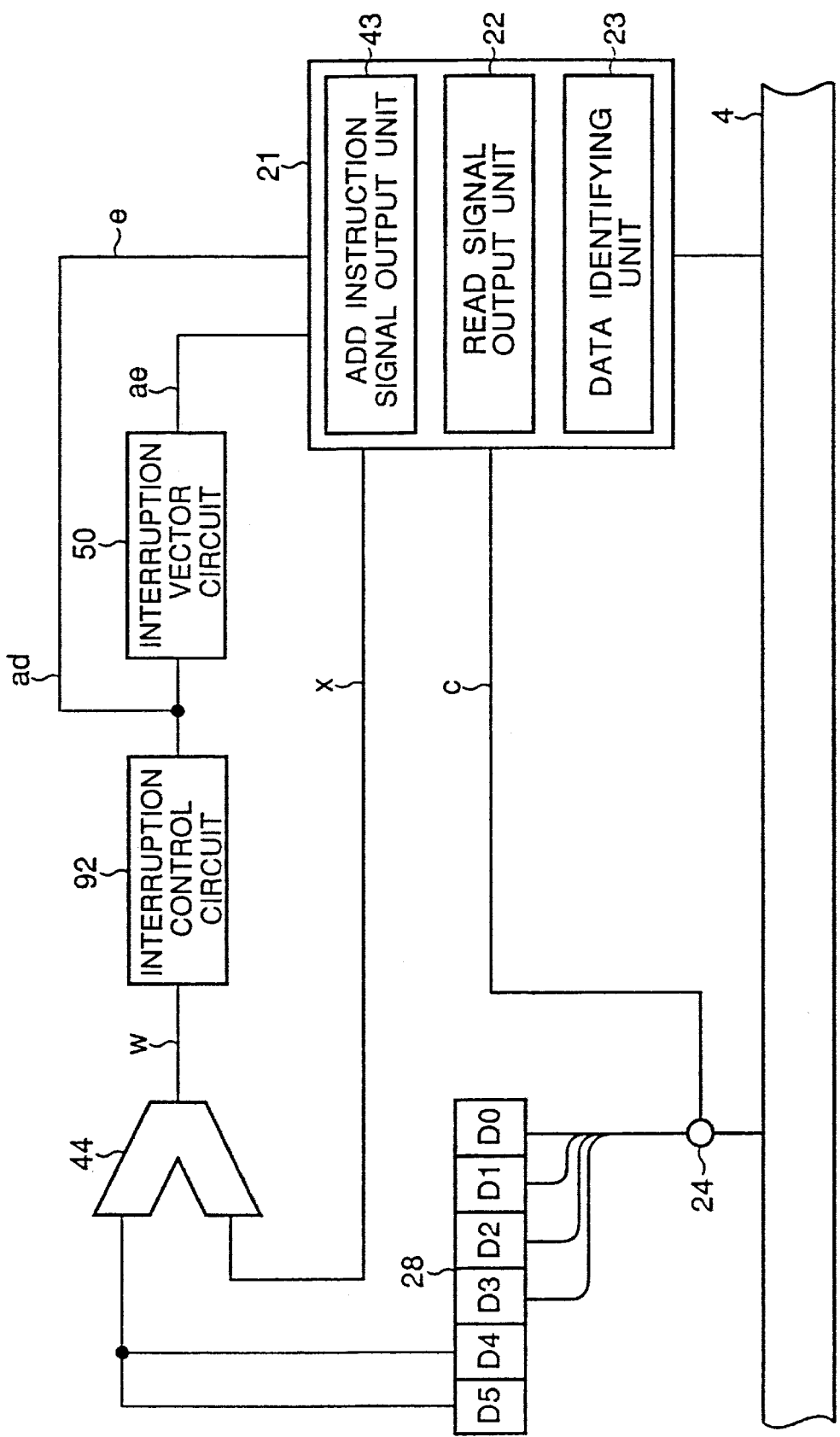
FIG. 27 is a block diagram showing the structure of a microcomputer according to a twenty-first embodiment of the present invention.

Referring next to FIG. 27, there is illustrated a block diagram showing the structure of a microcomputer according to a twenty-first embodiment of the present invention. In the figure, the same reference numerals as those shown in FIG. 12 denote the same or like components, and therefore the description about the components will be omitted hereinafter.

In FIG. 27, reference numeral 92 denotes an interruption control circuit which can furnish an interruption signal ad when the adder 44 delivers a carry signal w showing that a carry has occurred.

In the above-mentioned sixth embodiment, the skip circuit 45 is adapted to furnish the skip signal e when the adder 44 furnishes the carry signal w showing the occurrence of a carry. By contrast, the interruption control circuit 92 according to the present embodiment is adapted to furnish the interruption signal ad when the adder 44 furnishes the carry signal w showing the occurrence of a carry. Thus, the present embodiment can offer the same advantage as that provided by the above-mentioned sixth embodiment.

Figure 28:
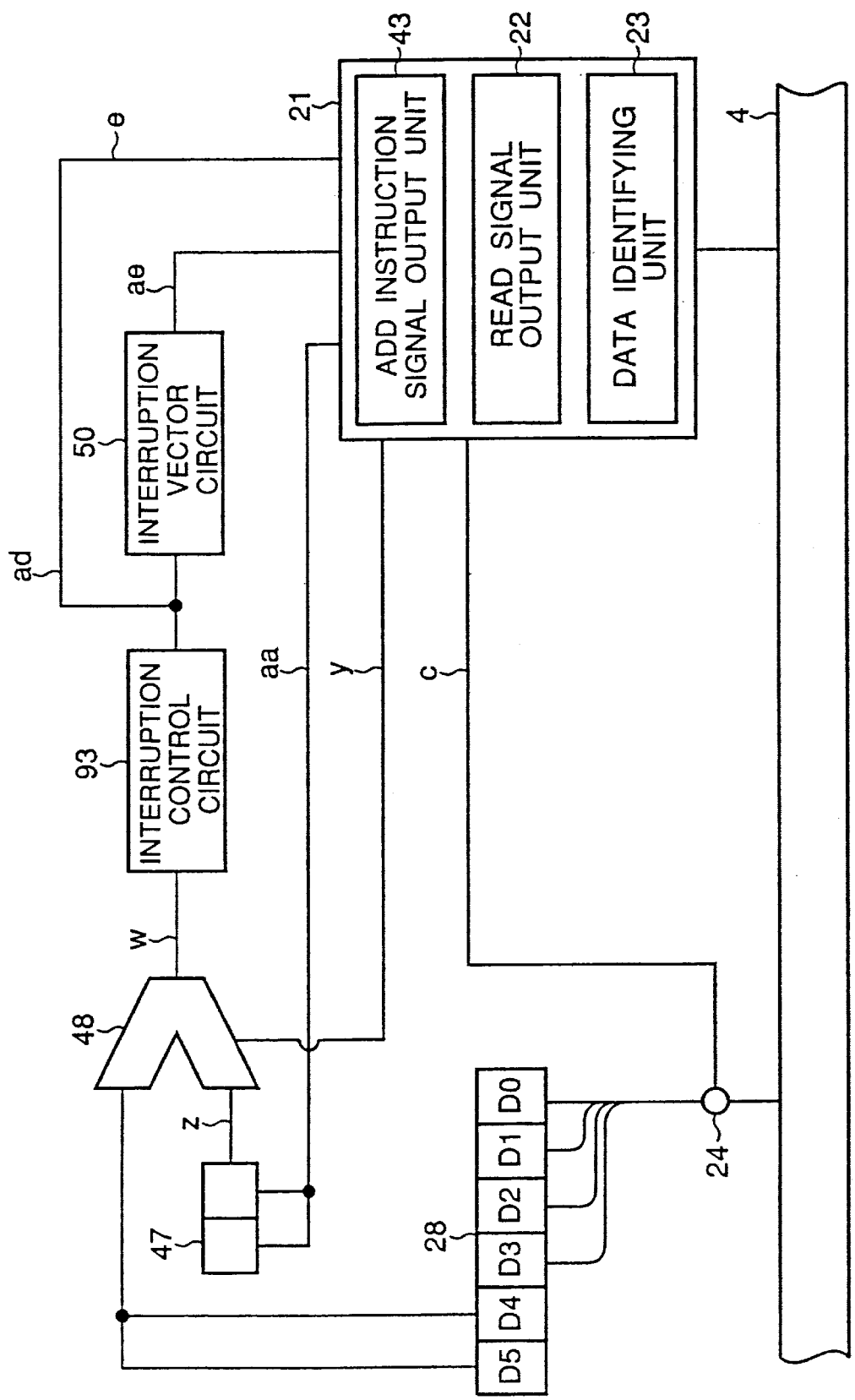
FIG. 28 is a block diagram showing the structure of a microcomputer according to a twenty-second embodiment of the present invention.
Figure 29:
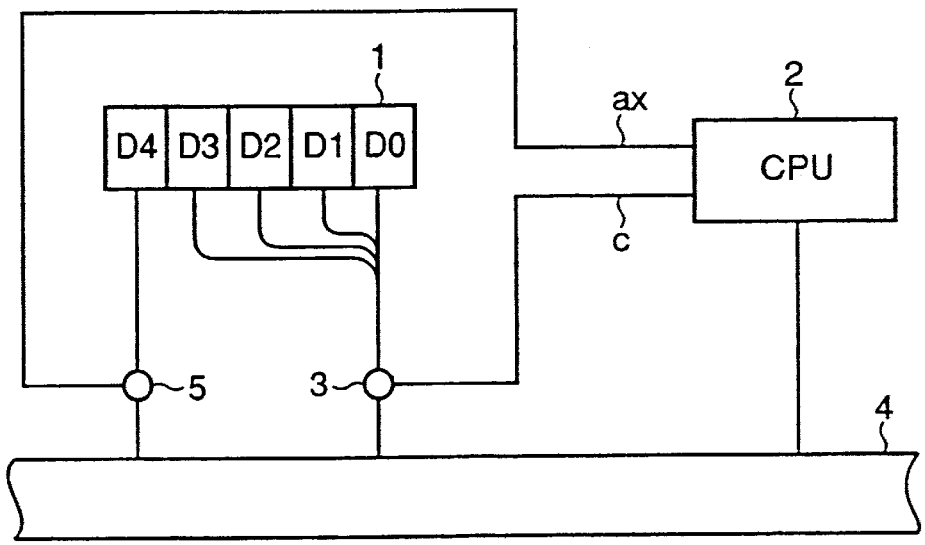
FIG. 29 is a block diagram showing the structure of a prior art microcomputer.

Referring next to FIG. 28, there is illustrated a block diagram showing the structure of a microcomputer according to a twenty-second embodiment of the present invention. In the figure, the same reference numerals as those shown in FIG. 13 denote the same or like components, and therefore the description about the components will be omitted hereinafter.

In FIG. 28, reference numeral 93 denotes an interruption control circuit which can furnish an interruption signal ad when the adder 48 delivers a carry signal w showing that a carry has occurred.

In the above-mentioned seventh embodiment, the skip circuit 45 is adapted to furnish the skip signal e when the adder 48 furnishes the carry signal w showing the occurrence of a carry. By contrast, according to the present embodiment, the interruption control circuit 93 is adapted to furnish the interruption signal ad when the adder 48 furnishes the carry signal w showing the occurrence of a carry. Thus, the present embodiment can offer the same advantage as that provided by the above-mentioned seventh embodiment.

As previously explained, the present invention offers the following advantages.

In accordance with a preferred embodiment of the present invention, there is provided a microcomputer comprising a skip circuit, responsive to a read signal from a read signal output unit, for obtaining all remaining bit data other than a plurality of bit data which are obtained by a gate circuit, from all the bit data of digital data stored in an AD converter so as to furnish a control having a value which differs according to the value of the remaining bit data. Therefore, this embodiment offers the advantage of being able to promptly identify the value of the digital data, which is an AD conversion result, stored in the AD converter, even though the number of bits of the digital data exceeds the number of bits that can be read at a time by the CPU of the microcomputer.

In accordance with another preferred embodiment of the present invention, there is provided a microcomputer comprising a skip circuit, responsive to a skip instruction signal from a skip instruction signal output unit, for obtaining all remaining bit data other than a plurality of bit data which are obtained by a gate circuit, from all the bit data of digital data stored in an AD converter so as to furnish a control having a value which differs according to the value of the remaining bit data. Therefore, this embodiment offers the advantage of being able to promptly identify the value of the digital data, which is an AD conversion result, stored in the AD converter, even though the number of bits of the digital data exceeds the number of bits that can be read at a time by the CPU of the microcomputer.

In accordance with another preferred embodiment of the present invention, there is provided a microcomputer comprising a skip circuit, responsive to an increment instruction signal from an increment instruction signal output unit, for obtaining all remaining bit data other than a plurality of bit data which are obtained by a gate circuit, from all the bit data of digital data stored in an AD converter so as to furnish a control having a value which differs according to the value of the remaining bit data. Therefore, this embodiment offers the advantage of being able to promptly identify the value of the digital data, which is an AD conversion result, stored in the AD converter, even though the number of bits of the digital data exceeds the number of bits that can be read at a time by the CPU of the microcomputer.

In accordance with another preferred embodiment of the present invention, there is provided a microcomputer comprising a skip circuit, responsive to an add instruction signal from an add instruction signal output unit, for obtaining all remaining bit data other than a plurality of bit data which are obtained by a gate circuit, from all the bit data of digital data stored in an AD converter so as to furnish a control having a value which differs according to the value of the remaining bit data. Therefore, this embodiment offers the advantage of being able to promptly identify the value of the digital data, which is an AD conversion result, stored in the AD converter, even though the number of bits of the digital data exceeds the number of bits that can be read at a time by the CPU of the microcomputer.

In accordance with another preferred embodiment of the present invention, there is provided a microcomputer comprising a skip circuit, responsive to an AD conversion end signal from an AD converter, for obtaining all remaining bit data other than a plurality of bit data which are obtained by a gate circuit, from all the bit data of digital data stored in the AD converter so as to furnish a control having a value which differs according to the value of the remaining bit data. Therefore, this embodiment offers the advantage of being able to promptly identify the value of the digital data, which is an AD conversion result, stored in the AD converter, even though the number of bits of the digital data exceeds the number of bits that can be read at a time by the CPU of the microcomputer.

In accordance with another preferred embodiment of the present invention, the gate circuit obtains the plurality of bit data at the low-order end of the digital data stored in the AD converter so as to furnish them by way of a data bus when the read signal shows that the microcomputer needs to identify the plurality of bit data at the low-order of the digital data, and alternatively obtains the plurality of bit data at the high-order end of the digital data stored in the AD converter so as to furnish them by way of the data bus when the read signal shows that the microcomputer needs to identify the plurality of bit data at the high-order of the digital data. Therefore, this embodiment offers the advantage of being able to select a plurality of bit data to be read by way of the data bus from among the digital data stored in the AD converter according to circumstances.

In accordance with another preferred embodiment of the present invention, the skip circuit determines whether or not the value of the remaining bit data that the skip circuit has obtained from the AD converter is coincident with a predetermined value so as to set the value of the control signal according to the determination result. Therefore, this embodiment offers the advantage of being able to select a plurality of bit data to be read by way of the data bus from among the digital data stored in the AD converter according to circumstances.

In accordance with another preferred embodiment of the present invention, the microcomputer includes a saving register for storing the remaining bit data that the skip circuit has obtained from the AD converter. Therefore, this embodiment can offer the advantage of being able to properly identify the value of digital data without the loss of the digital data even though the read signal is furnished and then the next AD conversion is complete before the skip instruction signal is delivered to the skip circuit with the result that the value stored in the AD converter is replaced by the next AD conversion result.

In accordance with another preferred embodiment of the present invention, when the CPU executes an instruction for forcing itself to neglect the remaining bit data during the execution of a software program including the instruction, the data identifying unit identifies the value of the digital data on the basis of only the plurality of bit data furnished by the gate circuit. Therefore, this embodiment can offer the advantage of being able to simplify data processing in which the uppermost or lowermost bit data can be neglected.

In accordance with another preferred embodiment of the present invention, the data identifying unit can skip an instruction included in a software program to be executed next according to the control signal furnished by the skip circuit. Therefore, this embodiment can offer the advantage of being able to identify the value of digital data stored in the AD converter without reading the uppermost bit data by way of the data bus.

In accordance with another preferred embodiment of the present invention, the control signal output unit including an interruption vector circuit furnishes an interrupt address to the data identifying unit according to the value of the remaining bit data and then the CPU executes an interrupt program specified by the interrupt address. Therefore, this embodiment can offer the advantage of being able to identify the value of digital data stored in the AD converter without reading the uppermost bit data by way of the data bus.

Many widely different embodiments of the present invention may be constructed without departing from the spirit and scope of the present invention. It should be understood that the present invention is not limited to the specific embodiments described in the specification, except as defined in the appended claims.

What is claimed is:

1. A microcomputer comprising:
   analog-to-digital (AD) converting means for converting an analog signal into digital data having a first value and storing a first number of data bits representing the first value;
   a data bus;
   a CPU for simultaneously reading a second number of data bits received from said data bus, the second number being less than the first number, said CPU including:
      read signal output means for producing a read signal after the first number of data bits are fixed and stored in said analog-to-digital converting means; and
      data identifying means for identifying the first value;
   gate means for, in response to the read signal, obtaining a first portion of the data bits stored in said analog-to-digital converting means and outputting the first portion to said data identifying means through said data bus, the first portion having the second number of bits;
   control signal output means for, in response to the read signal, obtaining as a second portion all data bits excluding the first portion from all of the data bits stored in said analog-to-digital converting means and producing a control signal having a second value based on the second portion and outputting said control signal to said data identifying means, wherein said data identifying means identifies the first value based on the first portion received through said data bus and the control signal output from said control signal output means.

2. The microcomputer according to claim 1, wherein the read signal has a value which differs according to whether said microcomputer identifies data bits at an uppermost or a lowermost end of the digital data, and wherein said gate means obtains the data bits at the uppermost end of the digital data when the read signal indicates identification of the data bits at the uppermost end of the digital data and, alternatively, obtains the data bits at the lowermost end of the digital data when the read signal indicates identification of the data bits at the lowermost end of the digital data.

3. The microcomputer according to claim 1, wherein said control signal output means determines whether a value of the second portion data that said control signal output means has obtained from said AD converting means is coincident with a predetermined value for setting the value of the second control signal.

4. The microcomputer according to claim 1, wherein said control signal output means includes a saving register for storing the second portion that said control signal output means has obtained from said AD converting means.

5. The microcomputer according to claim 1, wherein said CPU executes an instruction for forcing itself to neglect the second portion during execution of a program including the instruction, said data identifying means identifying the value of the digital data on the basis of the first portion.

6. The microcomputer according to claim 1, wherein said data identifying means determines whether to skip an instruction included in a software program to be executed next according to the value of the control signal.

7. The microcomputer according to claim 1, wherein the control signal represents an interrupt address and said CPU executes an interrupt program specified by the interrupt address.

8. A microcomputer comprising:
analog-to-digital (AD) converting means for converting an analog signal into digital data having a first value and storing a first number of data bits representing the first value;
a data bus;
a CPU for simultaneously reading a second number of data bits received from said data bus, the second number being less than the first number, said CPU including:
read signal output means for producing a read signal after the first number of data bits are fixed and stored in said analog-to-digital converting means; and
data identifying means for identifying the first value;
instruction signal output means for producing an instruction signal when said CPU executes an instruction associated with the digital data;
gate means for, in response to the read signal, obtaining a first portion of the data bits stored in said analog-to-digital converting means and outputting the first portion to said data identifying means through said data bus, the first portion having the second number of bits;
control signal output means for, in response to the instruction signal, obtaining as a second portion all bit data excluding the first portion from all of the bit data stored in said analog-to-digital converting means and producing a control signal having a second value based on the second portion and outputting the control signal to said data identifying means, wherein said data identifying means identifies the first value based on the first portion received through said data bus and the control signal output from said control signal output means.

9. The microcomputer according to claim 8, wherein the predetermined instruction is a skip instruction for an instruction to be executed next.

10. The microcomputer according to claim 8, wherein the predetermined instruction is an increment instruction for incrementing the value of the second portion.

11. The microcomputer according to claim 8, wherein the predetermined instruction is an add instruction for adding a predetermined value to the value of the second portion.

12. The microcomputer according to claim 8, wherein the read signal has a value which differs according to whether said microcomputer identifies data bits at an uppermost or a lowermost end of the digital data, and wherein said gate means obtains the data bits at the uppermost end of the digital data when the read signal indicates identification of the data bits at the uppermost end of the digital data and obtains the data bits at the lowermost end of the digital data stored in said AD converting means when the read signal indicates identification of the data bits at the lowermost end of the digital data.

13. The microcomputer according to claim 8, wherein said control signal output means determines whether a value of the second portion that said control signal output means has obtained from said AD converting means is coincident with a predetermined value for setting the value of the second control signal.

14. The microcomputer according to claim 8, wherein said control signal output means includes a saving register for storing the second portion that said control signal output means has obtained from said AD converting means.

15. The microcomputer according to claim 8, wherein when said microcomputer executes an instruction that does not need the second portion, said data identifying means identifies the value of the digital data on the basis of the first portion.

16. The microcomputer according to claim 8, wherein said data identifying means determines whether to skip an instruction included in a software program to be executed next according to the value of the control signal.

17. The microcomputer according to claim 8, wherein the control signal represents an interrupt address and said CPU executes an interrupt program specified by the interrupt address.

18. A microcomputer comprising:
analog-to-digital (AD) converting means for converting an analog signal into digital data having a first value and storing a first number of data bits representing the first value and producing a conversion end signal;
a data bus;
a CPU for simultaneously reading a second number of data bits received from said data bus, the second number being less than the first number, said CPU including:
read signal output means for producing a read signal after the first number of data bits are fixed and stored in said analog-to-digital converting means; and
data identifying means for identifying the first value;

gate means for, in response to the read signal, obtaining a first portion of the bit data stored in said analog-to-digital converting means and outputting the first portion to said data identifying means through said data bus, the first portion having the second number of bits;

control signal output means for, in response to the conversion end signal, obtaining a second portion of data bits from all of the data bits stored in said analog-to-digital converting means excluding the first portion and producing a control signal having a second value based on the second portion and outputting the control signal to said data identifying means, wherein said data identifying means identifies the first value based on the first portion received through said data bus and the control signal output from said control signal output means.

19. The microcomputer according to claim 18, wherein said CPU executes an instruction for forcing itself to neglect the second portion during execution of a program including the instruction, said data identifying means identifying the value of the digital data on the basis of the first portion.

20. The microcomputer according to claim 18, wherein the control signal represents an interrupt address and said CPU executes an interrupt program specified by the interrupt address.

* * * * *